(12) United States Patent
Ban et al.

(10) Patent No.: US 6,209,057 B1
(45) Date of Patent: Mar. 27, 2001

(54) STORAGE DEVICE HAVING DATA BUFFER

(75) Inventors: Akira Ban, Yokohama; Kiyomi Imamura, Kawasaki, both of (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/129,442

(22) Filed: Aug. 4, 1998

(30) Foreign Application Priority Data

Oct. 31, 1997 (JP) ................................. 9-301193

(51) Int. Cl.$^7$ .................................................. G06F 12/00
(52) U.S. Cl. ................... 711/111; 711/113; 711/118; 711/201; 711/205; 711/207
(58) Field of Search ........................... 711/111, 113, 118, 711/201, 205, 207

(56) References Cited

U.S. PATENT DOCUMENTS

| | | | |
|---|---|---|---|
| 4,760,526 | * | 7/1988 | Takeda et al. ........................... 707/7 |
| 5,781,922 | * | 7/1998 | Braceras et al. ...................... 711/118 |

FOREIGN PATENT DOCUMENTS

| | | |
|---|---|---|
| 463874 | 1/1992 | (DE) . |
| 1194042 | 8/1989 | (JP) . |
| 2048751 | 2/1990 | (JP) . |
| 4184525 | 7/1992 | (JP) . |
| 5074046 | 3/1993 | (JP) . |
| 5324435 | 12/1993 | (JP) . |
| 9146834 | 6/1997 | (JP) . |

* cited by examiner

Primary Examiner—Do Hyun Yoo
Assistant Examiner—Mehdi Namazi
(74) Attorney, Agent, or Firm—Greer, Burns & Crain, Ltd.

(57) ABSTRACT

In a storage device in which data is read ahead and stored in a cache memory during reading of data from a medium, a data buffer is managed so that the probability that data to be read is found in the cache memory will improve. The memory area in the cache memory is divided so that a DIR-associated data buffer area used to store a leading address and file name of each file, a FAT-associated data buffer area used to store an address of each file in the next sector, and a data division-associated data buffer area used to store data can all be defined. Addresses referring to the FAT-associated data buffer area and DIR-associated data buffer area are fixed. As a result, as more and more data is read, more and more valid data corresponding to the data residing in the FAT and DIR in a storage medium is found in the cache memory. Consequently, when data reading is requested, data can be transferred without the necessity of reading the storage medium. This results in a shortened reading time.

20 Claims, 18 Drawing Sheets

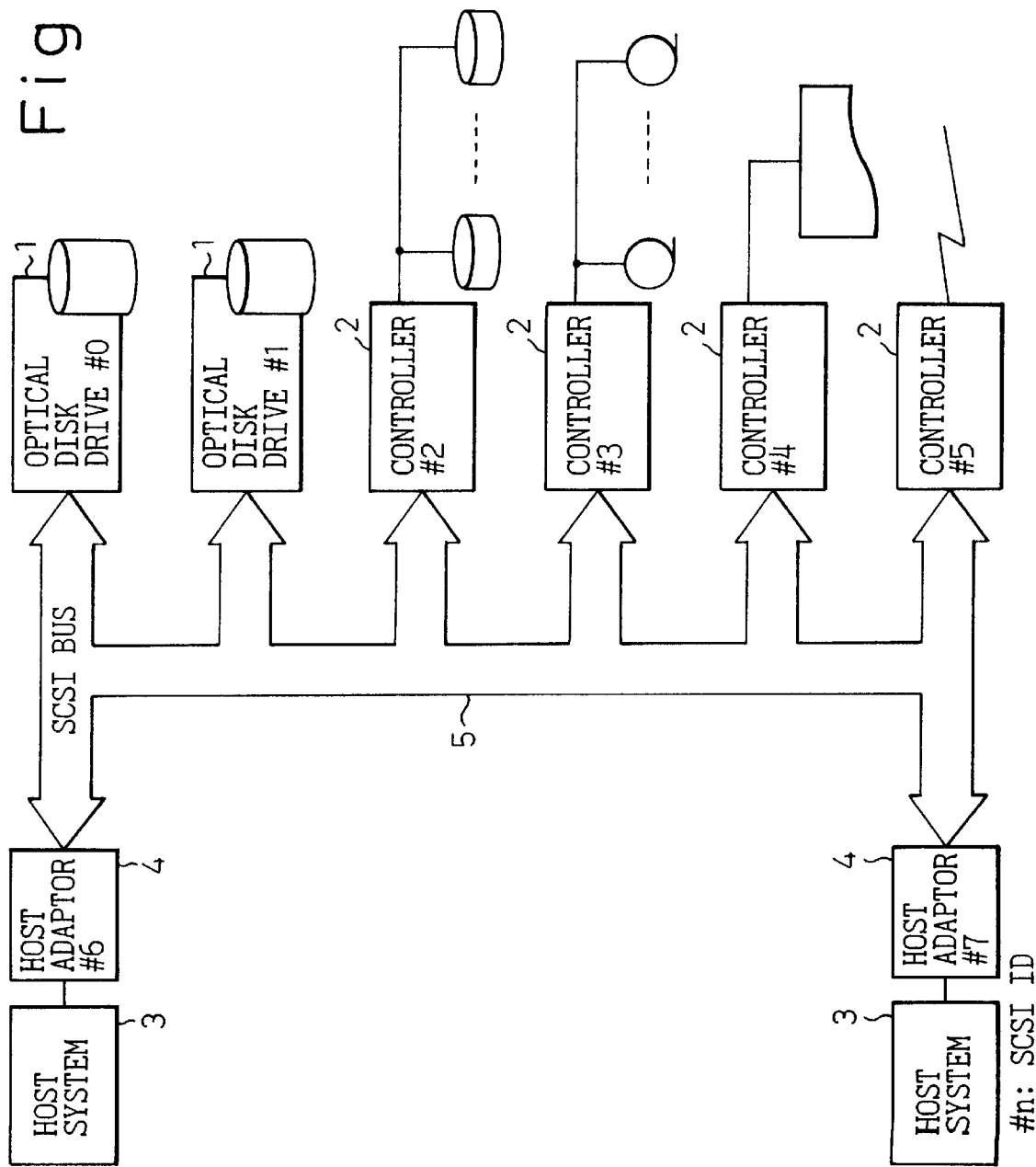

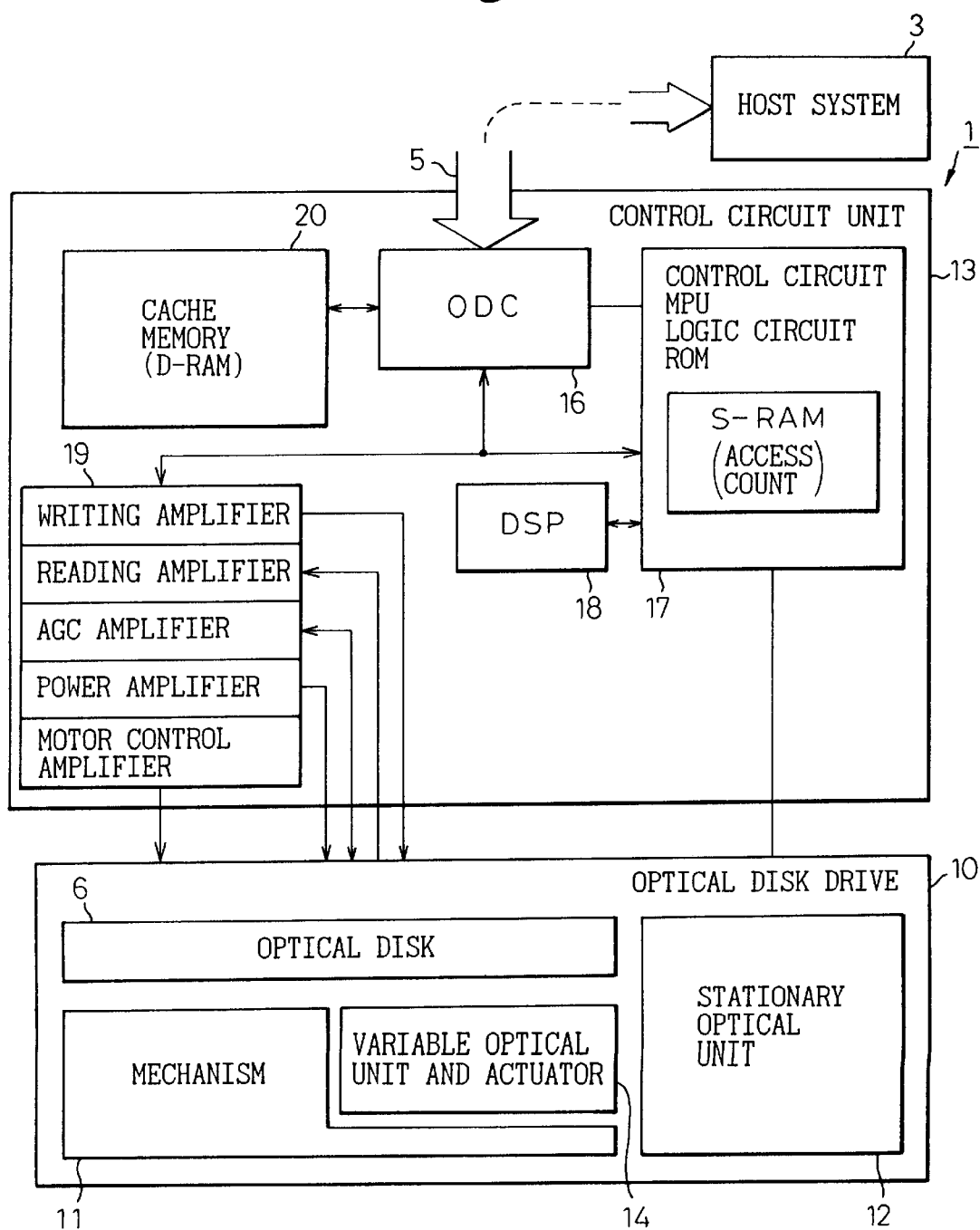

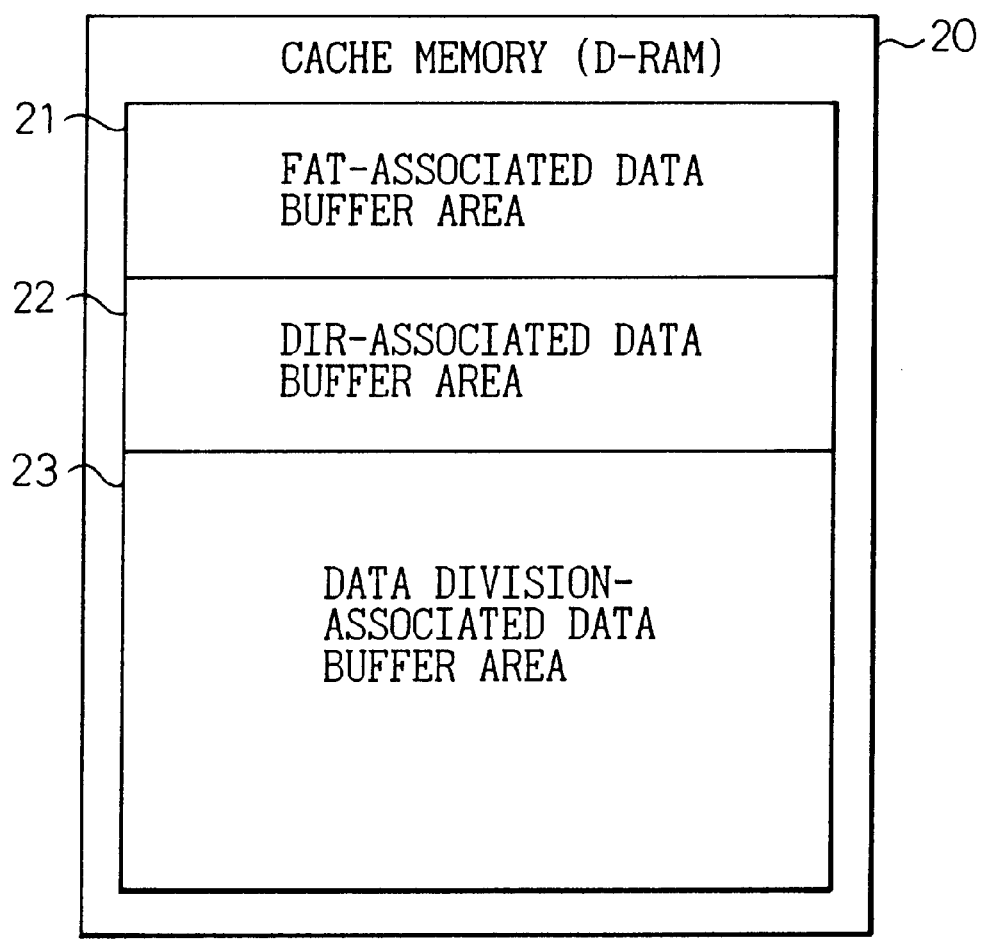

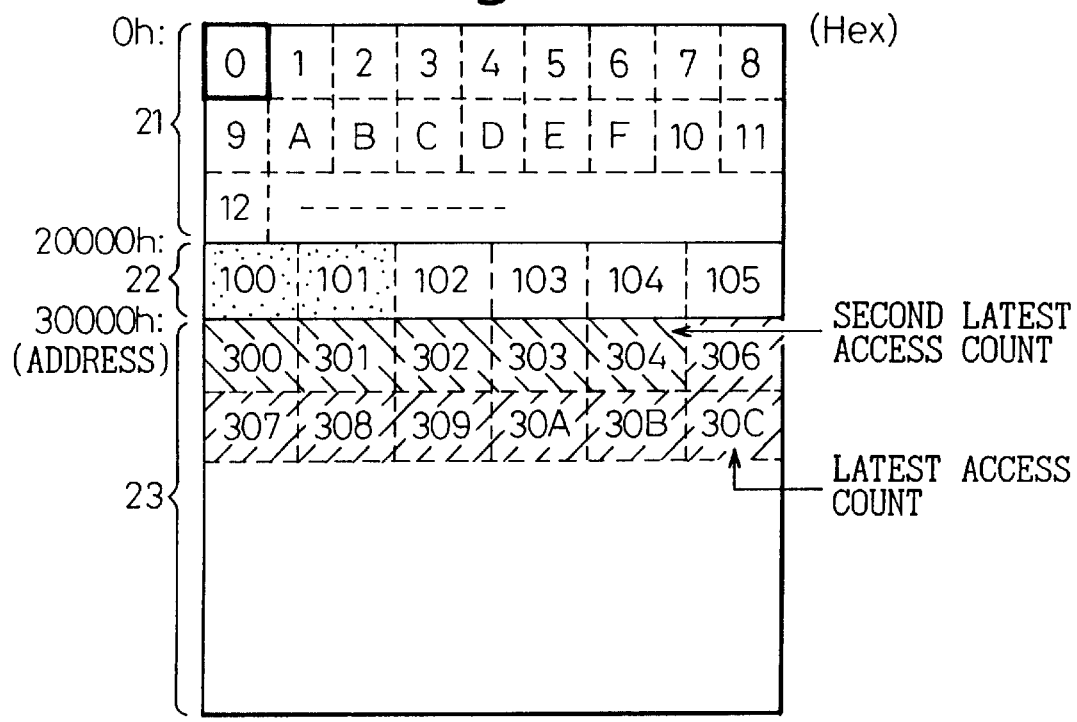
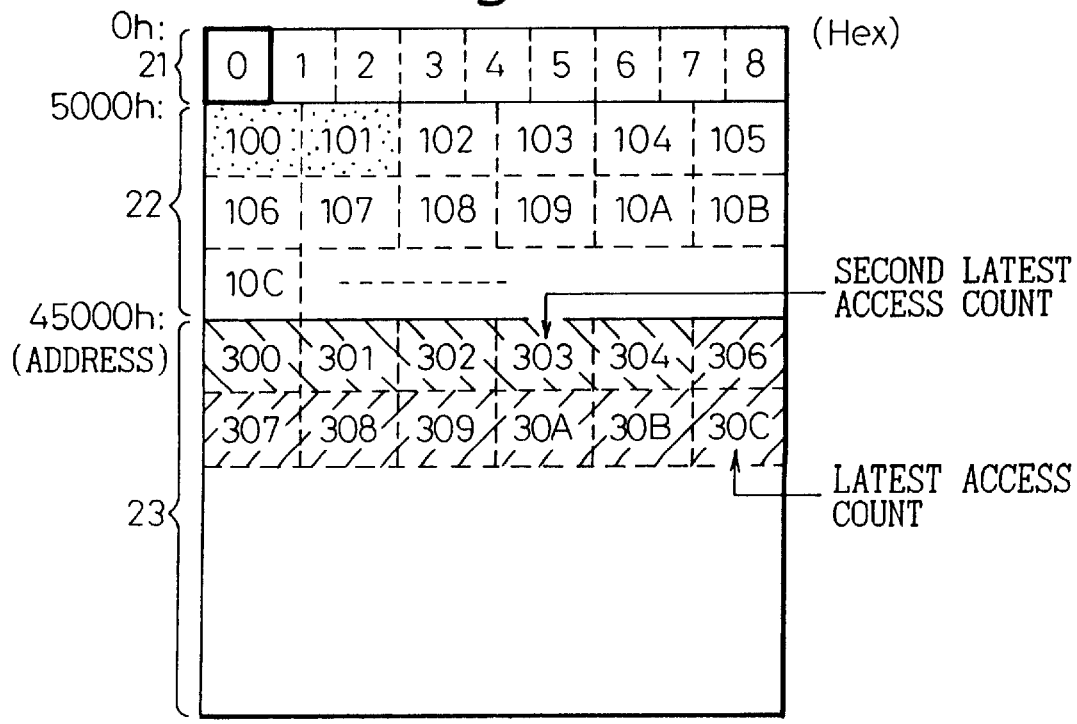

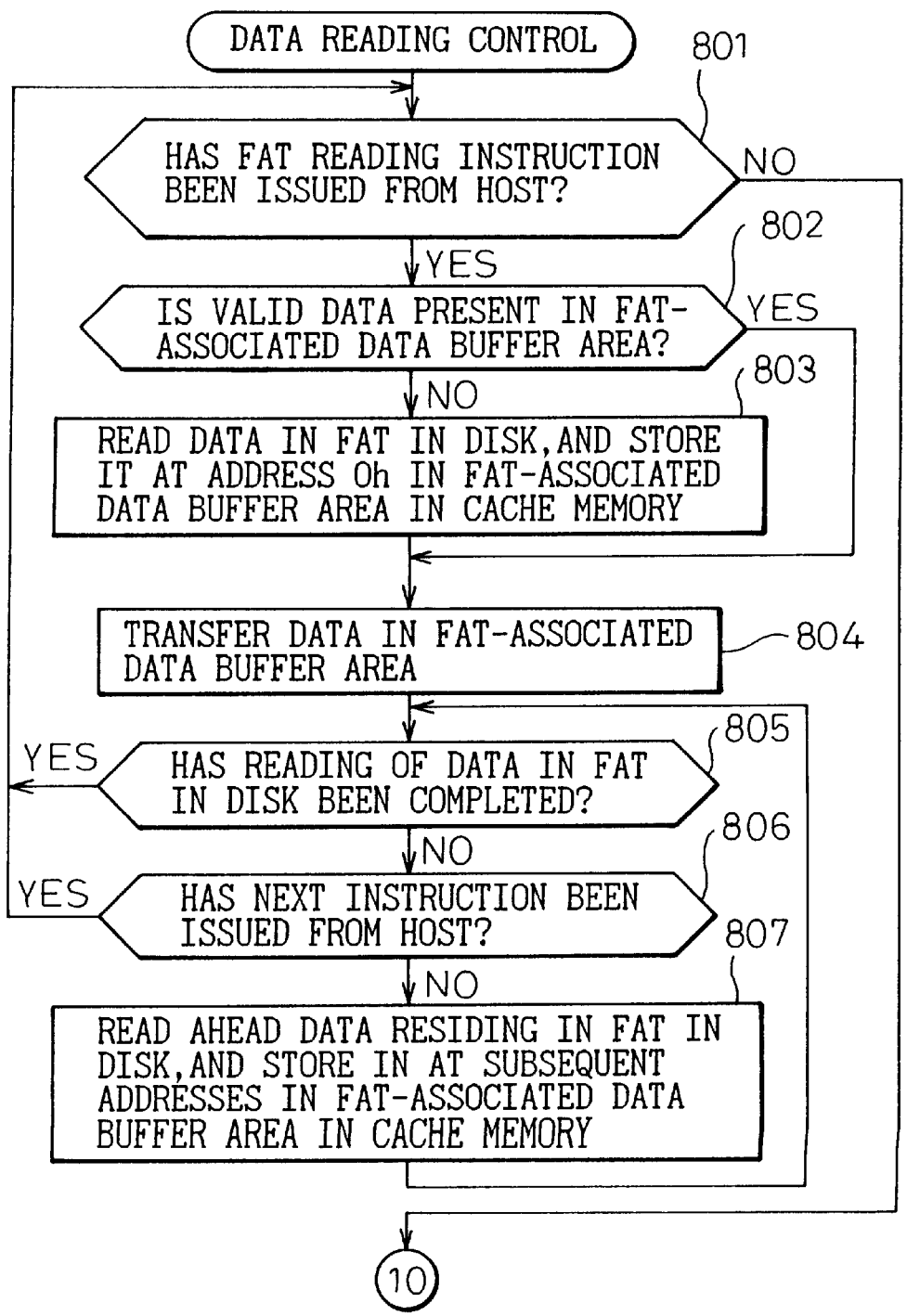

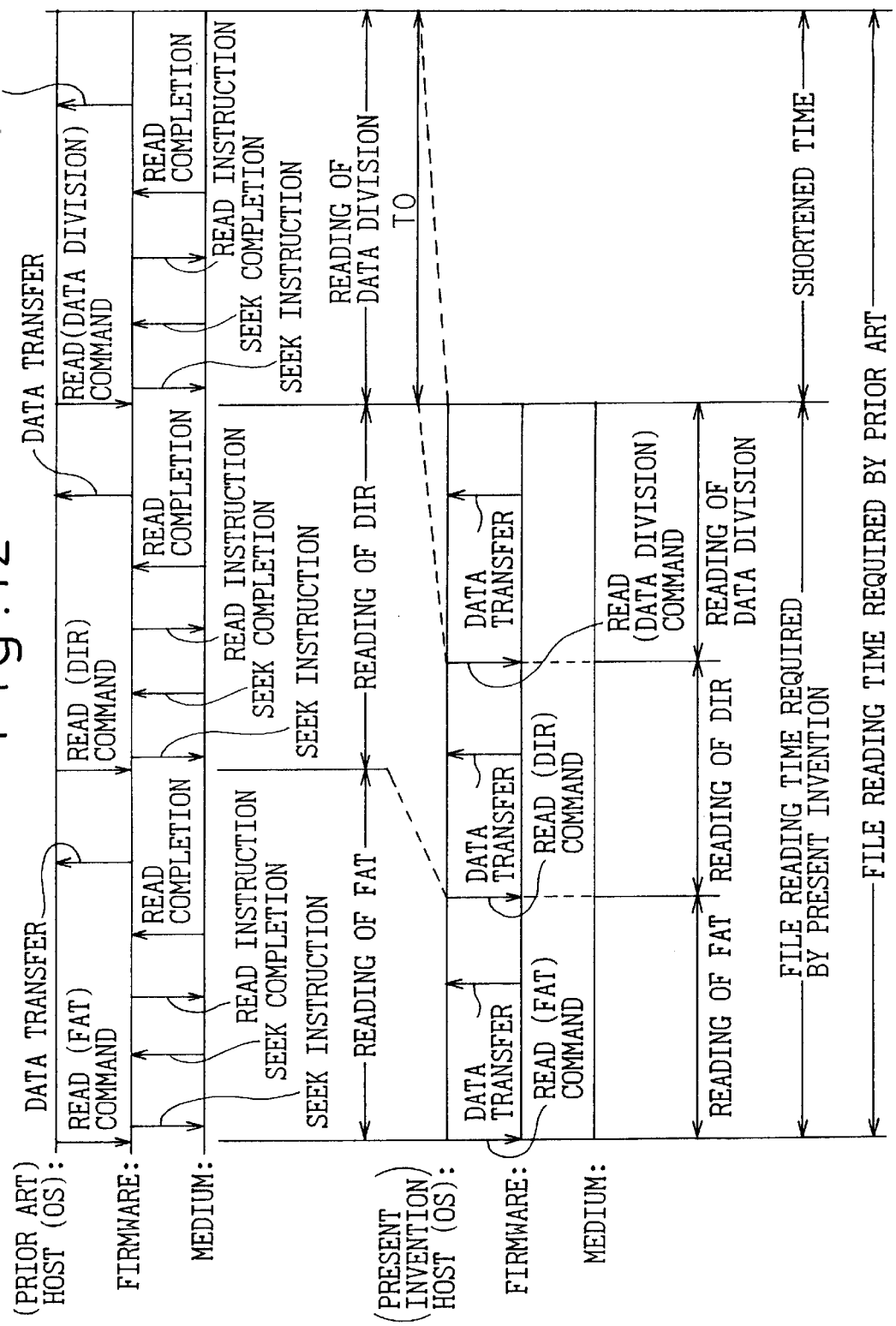

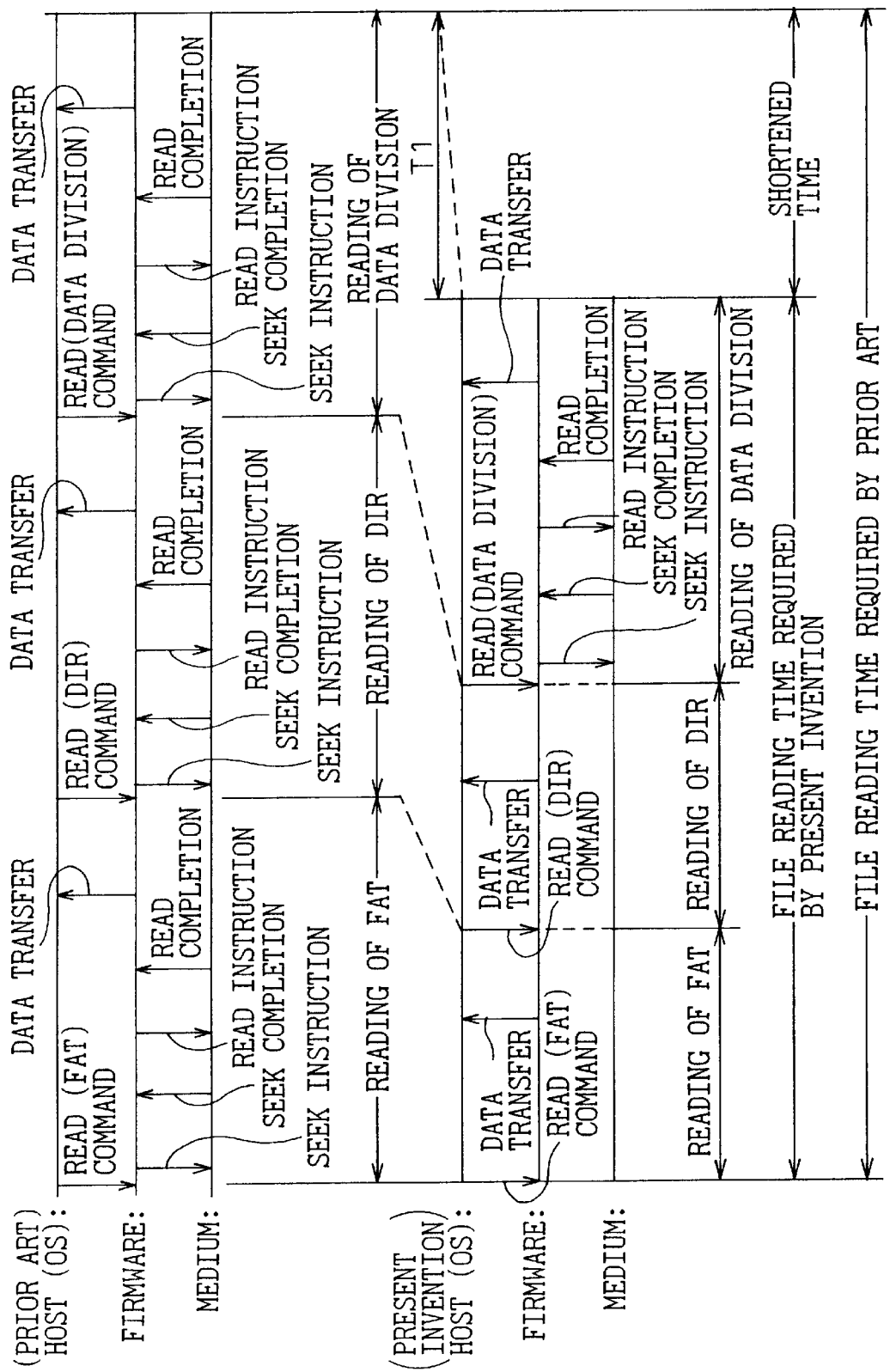

STORAGE DEVICE HAVING DATA BUFFER

BACKGROUND OF THE INVENTION

1. Field of the Invention

The present invention relates to a storage device characterized by a method of managing a data buffer. More particularly, this invention is concerned with a storage device in the form of an optical disk drive in a host computer and in which a data buffer is efficiently managed using an operating system (hereinafter OS).

2. Description of the Related Art

Conventionally, a file system employing an optical disk drive has a problem in that since the reading/writing rate permitted by the optical disk drive is lower than the processing speed permitted by a host computer (for example, the operating frequency of the host computer is 200 MHz and the operating frequency of the optical disk drive is about 25 MHz). If the data transfer rate is synchronized with the data reading/writing rate, the processing ability of the host computer deteriorates.

When the optical disk drive is connected to the host computer for use, a data buffer, with a high data transfer rate and referred to as a cache memory, is incorporated in the optical disk drive. Among instructions and data items sent from the host computer, those exhibiting high possibilities of future use are temporarily stored in the cache memory. Thus, the processing ability of the host computer is improved. The cache memory receives all the data items immediately and reports Normal Termination. When Normal Termination is reported, the OS of the host computer activates another task. This results in efficient processing. The control thus provided so that data temporarily stored in the cache memory can be used later is referred to as cache control. It is firmware in the optical disk drive, that is, a program residing in a ROM inside an MPU, that is responsible for cache control.

The cache control will be explained in more detail. For example, for writing data in the optical disk drive, the data is temporarily written in the cache memory in the optical disk drive, and the data in the cache memory is written slowly to an optical disk. By contrast, for reading data from the optical disk drive, data read from the optical disk is written in the cache memory and then transferred.

However, when data is initially read from the optical disk drive, since no data is present in the cache memory, the data transfer rate becomes equal to the reading rate permitted by the optical disk drive. When one file is read in response to a request sent from the OS, one sector is read with the first command. Since the possibility that reading the next sector (data written immediately successively) will be indicated by the next command sent from the OS is high, after the optical disk drive receives one command and returns Normal Termination to the OS, it starts reading data from the next sector before the next command comes, and stores the data in the cache memory. If the data stored in the cache memory matches data requested by the next command (if a cache hit is made), the stored data can be transferred from the cache memory.

However, when a requested sector indicated by the next command is different from a sector whose data has been stored in the cache memory (data in the sector does not make a cache hit), data in the indicated sector of the optical disk drive is read again by using processing time. This is inefficient. It is therefore demanded to improve a hit ratio, relative to data stored in advance in the cache memory, when data is read from the optical disk drive.

Information handled by a computer is programs and data items. For facilitating classifying of or working on the programs and data items, such as, storage, reading, retrieval, and correction, the programs and data items are each named in units of a certain set of information blocks (this is called a file). The OS of a host computer manages data items in memory areas included in all storage devices by adopting a unique control mode. Whichever of various control modes is adopted, at least the three facilities to be described below are included for managing data.

(1) File allocation table (hereinafter FAT)
(2) Directory (hereinafter DIR)
(3) Data division The FAT is used to store the one or more addresses of the subsequent sectors of the file which is stored over a plurality of sectors of a disk medium to be loaded in an optical disk drive. The DIR is used to store a leading address and file name of each file. The data division is used to store data.

For reading file data, the OS first reads information concerning the data division from the FAT and DIR. Based on the read information, the OS reads data from the data division. In other words, for reading data from the data division, the work of reading the FAT and DIR must be carried out without fail.

However, a conventional cache control mode does not care about a procedure of reading the FAT, DIR, and data division in a cache memory. According to a reading instruction sent from the OS, the FAT, DIR, and data division of a disk medium are read at random, and read data is stored in the cache memory. Furthermore, data succeeding the data read with a previous instruction is read ahead and stored in the cache memory until the next instruction comes. If the data division consists of distributed spaces, there is a problem that the probability that data items corresponding to data items in the FAT and DIR will be found in the cache memory is low.

The problem will be described more particularly. According to a prior art, a cache memory is not divided into areas in which data items to be read from a FAT, DIR, and data division are stored. When a Read command indicating reading of the FAT comes first, data is read from the first sector within the FAT. Thereafter, data is read from the next and subsequent sectors within the FAT, and then stored in the cache memory. If the next Read command indicates reading of the data division but not of the FAT, the data read ahead from the FAT is overwritten with data read from a sector within the data division. Thereafter, data is read from the next sector within the data division and stored. The data read ahead from the FAT is demolished. Even if a Read command indicating reading of the FAT comes thereafter, the data read from the FAT has already disappeared from the cache memory. Data in the FAT does not make a hit. The same applies to data in the DIR or data division.

SUMMARY OF THE INVENTION

An object of the present invention is to provide a storage device such as an optical disk drive in which: management of data in a data buffer incorporated in the storage device is achieved using a plurality of kinds of data items; and each data is read ahead during reading of data from a storage medium, and then stored in the data buffer, and in which a data buffer management method of managing memory areas in the data buffer in such a way that the plurality of kinds of read ahead data items will not be deleted, and that a probability that data to be read is found in the data buffer during data reading will be high, is implemented.

According to the first aspect of the present invention attempting to accomplish the above object, there is provided a storage device comprising a disk medium, and a data buffer in which data to be stored in the disk medium or data read from the disk medium is stored temporarily. The disk medium includes at least a storage unit for first information used to store data items constituting each file that is an information unit, a storage unit for second information which is an index table indicating storage locations of files, and a storage unit for third information which is list information of files. In the storage device for reading or writing desired data on the basis of the information in the storage units, the memory area in the data buffer is divided into areas with boundary addresses among the areas fixed so that at least a memory area for the first information, a memory area for the second information, and a memory area for the third information can all be defined. When data is read from the disk medium, data read from the first information storage unit is stored and preserved in the first information memory area, data read from the second information storage unit is stored and preserved in the second information memory area, and data read from the third information storage unit is stored and preserved in the third information memory area. Thus, the data buffer is managed.

According to the first aspect of the present invention, the storage capacity of the second information memory area in the data buffer and the storage capacity of the third information memory area therein can agree with the storage capacity of the second information storage unit in the disk medium and the storage capacity of the third information storage unit therein respectively.

Moreover, according to the first aspect, the storage capacity of one of the second information memory area and third information memory area in the data buffer can agree with the storage capacity of an associated information storage unit in the disk medium.

According to the second aspect of the present invention, there is provided a storage device comprising a disk medium and a data buffer in which data to be stored in the disk medium or data read from the disk medium is temporarily stored. The disk medium includes a storage unit for first information used to store data items constituting each file that is an information unit, a storage unit for second information which is an index table indicating storage locations of files, a storage unit for third information which is list information of files. In the storage device for reading or writing desired data on the basis of the information in the storage units, the memory area in the data buffer is divided into two areas of an areas with a large storage capacity and an area with a small storage capacity with a boundary address between them fixed. The area with a small storage capacity serves as an area exclusively used to store data read from one of the second information storage unit and third information storage unit in the disk medium, while the area with a large storage capacity serves as a memory area used in common to store data read from the other one of the second information storage unit and third information storage unit in the disk medium, and data read from the first information storage unit. When data is read from the disk medium, data read from one of the second information storage unit and third information storage unit in the disk medium is stored and preserved in the area with a small storage capacity in the data buffer. Data read from the first information storage unit and data read from the other one of the second information storage unit and third information storage unit are stored and preserved in common in the area with a large storage capacity. Thus, the data buffer is managed.

According to the present invention, when the memory area in the data buffer becomes full, buffer addresses at which new data is to be stored can be set to addresses starting with an address containing information whose storage date is old.

Moreover, when the memory area in the data buffer becomes full, buffer addresses at which new data is to be stored may be set to addresses starting with an address containing information whose access frequency is low.

Moreover, the storage device is an optical disk driver or the like. The first information storage unit may be a data division, the second information storage unit may be an index table, and the third information storage unit may be a directory. Furthermore, the data buffer may be a cache memory.

According to the first aspect of the present invention, the memory area in the data buffer is divided into areas used exclusively to store data read from three kinds of information storage units defined in the disk medium, for example, the three storage units of a FAT, DIR, and data division. When a logic block address instructed by a host computer is included in a specified information storage unit, the read data of the specified information storage unit is developed in an associated specified information memory area in the data buffer and then transferred. Thereafter, data in the same storage unit is read ahead and developed in the same area. If the next instruction instructs reading of another information unit, data read from the information unit is developed in another associated memory area in the data buffer. The data in the area in which previous data is developed will therefore not be deleted. As a result, when a reading instruction is issued for the same information storage unit as an information storage unit for which a previous instruction is issued, the probability that data corresponding to the data in the information unit is found in the data buffer is high. When the data is found, it can be immediately read from the data buffer and then sent.

Moreover, according to the second aspect of the present invention, the memory area in the data buffer is divided into two areas; a memory area used to store data read from an information storage unit, that is, the data division defined in the disk medium, and a memory area used to store data read from a specified information storage unit, for example, the FAT. If a logic block address instructed by a host computer refers to the specified information storage unit, the data read from the specified information storage unit is developed in an associated specified memory area in the data buffer, and then transferred. Thereafter, data in the same storage unit is read ahead and developed in the same area. If a logic block address instructed by the host computer refers to the data division, the data read from the storage unit, that is, the data division is developed in the data division-associated memory area in the data buffer, and then transferred. Thereafter, data in the data division is read ahead and developed in the same area. Moreover, if a logic block address instructed by the host computer refers to another specified information storage unit, the data read from the another specified information storage unit is developed in common in the data division-associated memory area in the data buffer, and then transferred. Thereafter, data in the another specified information storage unit is read ahead and developed in the data division-associated memory area. As a result, when a reading instruction is issued for the same information storage unit as the information storage unit for which the previous instruction is issued, a probability that data corresponding to the data in the information storage unit is found in the data buffer is high. If the data is found, it can be immediately read from the data buffer and then sent.

When the storage capacity of the memory area in the data buffer is low, new data is stored in a memory area containing data whose storage date is old or a memory area containing data whose access frequency is low.

For example, if a reading instruction is issued for the FAT, read data and read-ahead data are developed in an FAT-associated memory area in the data buffer. If a reading instruction is issued for the DIR, read data and read-ahead data are developed in a DIR-associated memory area in the data buffer. If a reading instruction refers to neither the FAT nor DIR, read data and read-ahead data are developed in a data division-associated memory area in the data buffer.

The data buffer is thus managed by use and information read and stored remains until the capacity of the information memory area runs out. When a reading instruction instructing reading of the information arrive, the information is found in the information memory area without fail. This obviates the necessity of reading data again. Consequently, the reading rate increases and the performance of the storage device improves.

BRIEF DESCRIPTION OF THE DRAWINGS

The present invention will be more clearly understood from the description as set forth below with reference to the accompanying drawings, wherein:

FIG. 1 is a block circuit diagram showing an example of a system configuration in which a storage device having a data buffer is employed;

FIG. 3 is a block diagram showing the internal configuration of the optical disk drive shown in FIGS. 2A and 2B;

FIG. 4 is an explanatory diagram showing an example of division of a cache memory shown in FIG. 3 in accordance with the present invention;

FIG. 7A is a block diagram showing the third embodiment of division of the cache memory shown in FIG. 4;

FIG. 7B is a block diagram showing the fourth embodiment of division of the cache memory shown in FIG. 4;

FIG. 8 is part of a flowchart describing a data reading procedure employed in a data buffer management method implemented in a storage device in accordance with the present invention;

FIG. 12 is an explanatory diagram showing a shortened reading time, which is required for reading data from a storage medium when data items corresponding to all data items in a FAT, DIR, and data division are found in a cache memory, in comparison with a conventional data reading time;

FIG. 13 is an explanatory diagram showing a shortened reading time, which is required for reading data from a storage medium when data items corresponding to data items in the FAT and DIR are found in the cache memory, in comparison with a conventional data reading time;

DESCRIPTION OF THE PREFERRED EMBODIMENTS

Figure 2A:
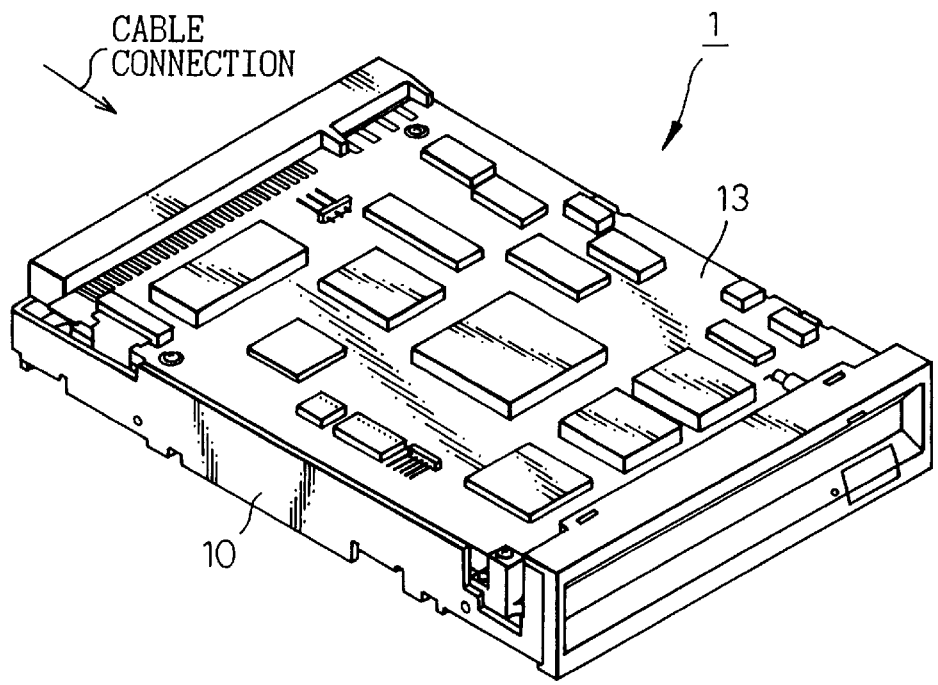
FIG. 2A is a diagram showing the appearance of an optical disk drive shown in FIG. 1.

Referring to the appended drawings, the aspects of the present invention will be explained in detail on the basis of exemplary embodiments.

FIG. 1 is a block diagram showing an example of a system configuration in which a storage device having a data buffer is employed, wherein two optical disk drives 1 are used as storage devices. The optical disk drives 1 are connected on an SCSI bus 5 within a system, and execute an input or output operation designated by a host system 3 that operates as an initiator for activating the input or output operation and that is connected on the SCSI bus 5. Connected on the SCSI bus 5 are, in this example, eight SCSI devices (two optical disk drives 1, four controllers 2, and two host adaptors 4). Inherent device addresses (#0 to #7) are assigned to the SCSI devices. The system of this example is a multi-host system in which two host systems 3 each operating as an initiator are interconnected. Hard disks are connected to the controller 2 of device address #2. Magnetic tapes are connected to the controller 2 of device address #3. A printer is connected to the controller 2 of device address #4, and a communication system is connected to the controller 2 of device address #5.

Figure 2B:
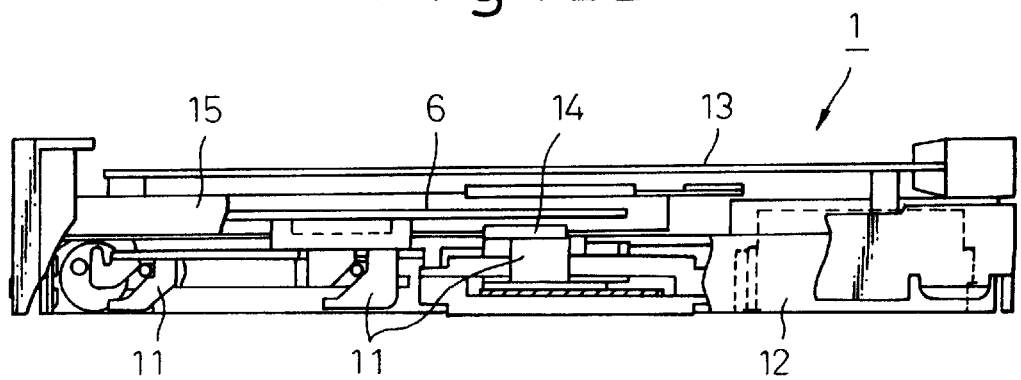
FIG. 2B is a diagram showing the internal structure of the optical disk drive shown in FIG. 1.

FIG. 2A is a diagram showing the appearance of the optical disk drive 1 shown in FIG. 1, and FIG. 2B is a diagram showing the internal structure thereof. The optical disk drive 1 has a mechanism 11, a stationary optical unit 12, a control circuit unit 13, and a variable optical unit and actuator 14 arranged in a disk enclosure 10. An optical disk 6 within an optical disk cartridge 15 to be mounted or demounted in or from the disk enclosure 10 by means of the mechanism 11 is used as a storage medium.

Detailed explanation will be omitted. The mechanism 11 includes a spindle motor, a positioner, a head actuator, a bias magnet, and a vertical movement mechanism for the spindle motor. Moreover, the stationary optical unit 12 consists of an optical system, position detector, and laser diode control circuit. The control circuit unit 13 is mounted on the outer surface of the disk enclosure 10, and includes an SCSI connector, a device control circuit, a cache memory serving as a data buffer, and an SCSI controller.

FIG. 3 is a block diagram showing the internal configuration of the optical disk drive 1 described in conjunction with FIGS. 2A and 2B. Incorporated in the disk enclosure 10 of the optical disk drive 1 are, as mentioned above, the mechanism 11, stationary optical unit 12, variable optical unit and actuator 14, and optical disk 6. The control circuit unit 13 formed on the outer surface of the disk enclosure 10 of the optical disk drive 1 includes an optical disk controller (ODC) 16, a control circuit 17 connected to the ODC 16 and composed of an MPU, logic circuit, ROM, and S-RAM, a digital signal processor (DSP) 18 connected to the control circuit 17, a group of amplifiers 19 connected to the ODC 16 and control circuit 17 and used to drive the disk drive enclosed in the disk enclosure 10, and a cache memory (formed with a D-RAM) 20 connected to the ODC 16 and serving as a buffer memory.

In the optical disk drive 1, so-called cache control is provided, that is, data transfer between the SCSI bus 5 and the disk medium in the optical disk cartridge 15 is executed by the MPU via the cache memory 20. Since data can be stored in the cache memory 20, the host system 3 serving as an initiator can carry out input or output processing efficiently by making the most of the ability of the SCSI bus 5 to transfer data at a high speed irrespective of the valid data transfer rate permitted by the optical disk drive 1.

Reading, transfer, development, management, and any other operation that will be described later shall be executed by the foregoing MPU unless otherwise described.

Cache control will be explained in more detail. When the host system 3 issues a Write command to the optical disk drive 1, the optical disk drive 1 transfers writing data to the cache memory 20, and reports termination of the Write command at the completion of data transfer. The optical disk drive 1 then carries out writing and verification asynchronously with an SCSI operation. As a result, an apparent Write command processing time by which the host system 3 must wait is shortened. Consequently, the input and output characteristics of the host system 3 improve.

When the host system 3 issues a Read command to the optical disk drive 1, after the optical disk drive 1 terminates execution of the Read command instructing reading of data from the optical disk 6, the optical disk drive 1 autonomously reads a subsequent data block and stores it in the cache memory 20. This operation is called a read-ahead operation. When the next command sent from the host system 3 is a request for data read ahead and stored in the cache memory 20, the data in the cache memory can be transferred without the necessity of accessing the optical disk 6. This results in fast sequential data access.

In the foregoing data reading control within cache control, a hit means that data read with the next command sent from the host system 3 is consistent with data read ahead and stored in the cache memory. The higher the hit ratio is, the faster access to sequential data is.

Figure 5:
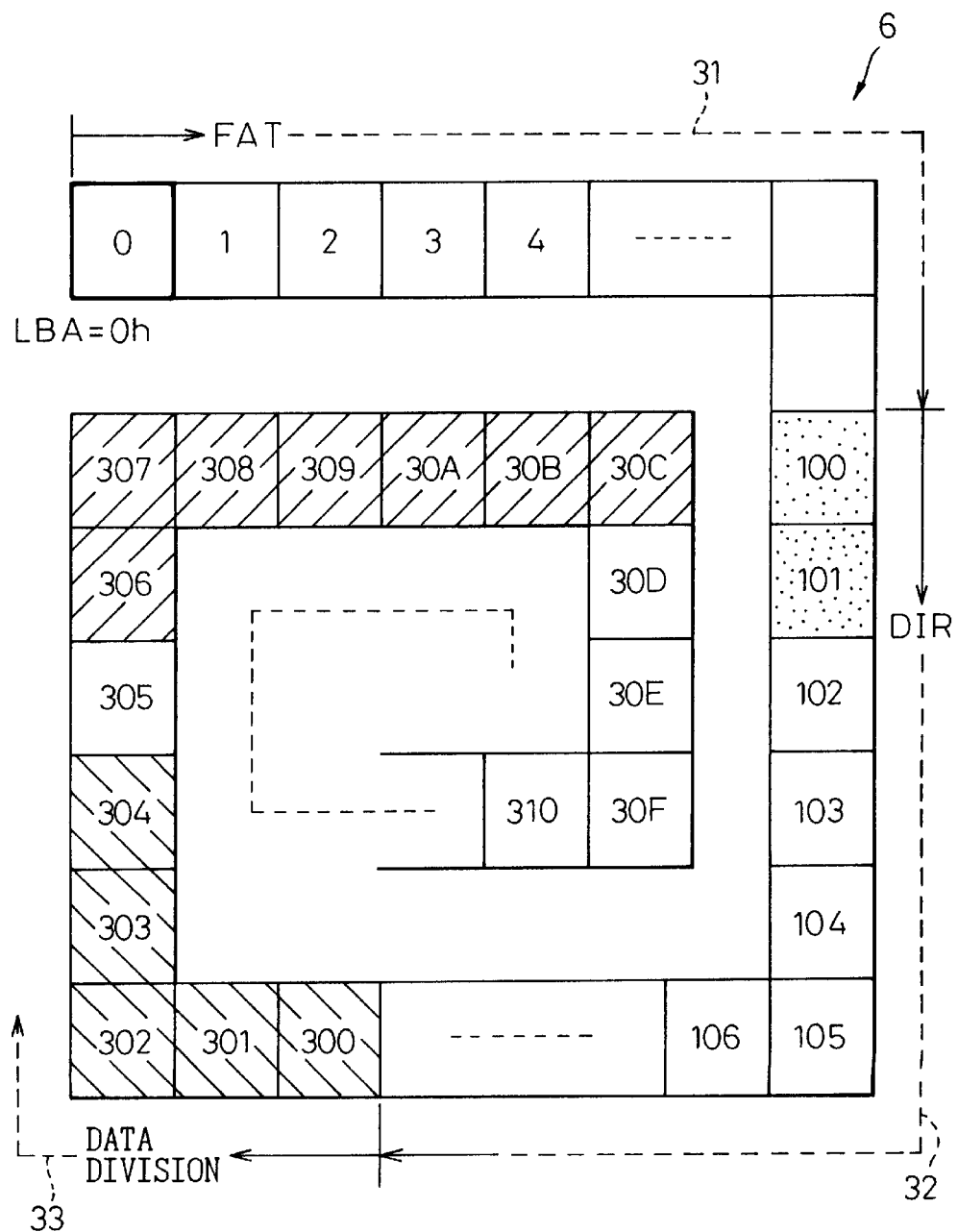
FIG. 5 is an explanatory diagram showing the structure of a storage area in an optical disk.

According to the present invention, the data buffer area in the cache memory 20 is, as shown in FIG. 4, divided into three areas; a FAT-associated data buffer area 21, a DIR-associated data buffer area 22, and a data division-associated data buffer area 23. A reason why the data buffer area in the cache memory is divided into the three areas lies in that a storage area formed spirally in the optical disk 6 falls, as shown in FIG. 5, into an FAT 31 starting with logical block address (LBA) 0, a DIR 32 succeeding the FAT, and a data division 33.

According to the present invention, if a logical block address instructed by the host system refers to the FAT 31, read data is developed in the FAT-associated data buffer area 21 in the cache memory 20. If the logical block address refers to the DIR 32, the read data is developed in the DIR-associated data buffer area 22. If the logic block address instructed by the host system refers to neither the FAT 31 nor DIR 32, the read data is developed in the data division-associated data buffer area 23.

As mentioned above, the data buffer areas 21 to 23 in the cache memory 20 are managed by purpose of use. Data items corresponding to the data items in the FAT 31 and DIR 32 in the disk medium are found in the FAT-associated data buffer area 21 and DIR-associated data buffer area 22 respectively without fail. When a request for reading of the FAT 31 or DIR 32 in the optical disk 6 is issued from the host system 3, once data is read from the FAT or DIR and stored in the associated data buffer area 21 or 22 in the cache memory 20, a data transfer operation of transferring the data from the cache memory 20 and reading the data division 33 should merely be carried out. This leads to the improved performance of the optical disk drive 1.

Now, a process according to which a typical operating system (OS) installed in the host computer 3 reads data from the optical disk 6 in the optical disk cartridge 15 will be described by taking a practical example.

As an embodiment, division of the cache memory 20 to be effected when file A and file B listed below are stored in the optical disk 6 and are to be read duly will be described.

| File A: | FAT data | LBA = 0, | Number of blocks = 1 |
|---|---|---|---|
| | DIR data | LBA = 100, | Number of blocks = 2 |
| | data-division data | LBA = 300, | Number of blocks = 5 |
| File B: | FAT data | LBA = 0, | Number of blocks = 1 |
| | DIR data | LBA = 100, | Number of blocks = 2 |
| | data-division data | LBA = 306, | Number of blocks = 7 |

(Note that LBA stands for a logical block address.)

FAT data belonging to file A and file B is stored in common in a block of LBA 0 in the FAT 31 shown in FIG. 5. DIR data belonging to file A and file B is stored in common at LBAs 100 and 101 in the DIR 32. The data-division data belonging to file A is stored at LBAs 300 to 304 in the data division 33, while the data-division data belonging to file B is stored at LBAs 306 to 30C in the data division 33. Note that the LBAs are written in hexadecimal notation.

(1) First Embodiment

Figure 6A:
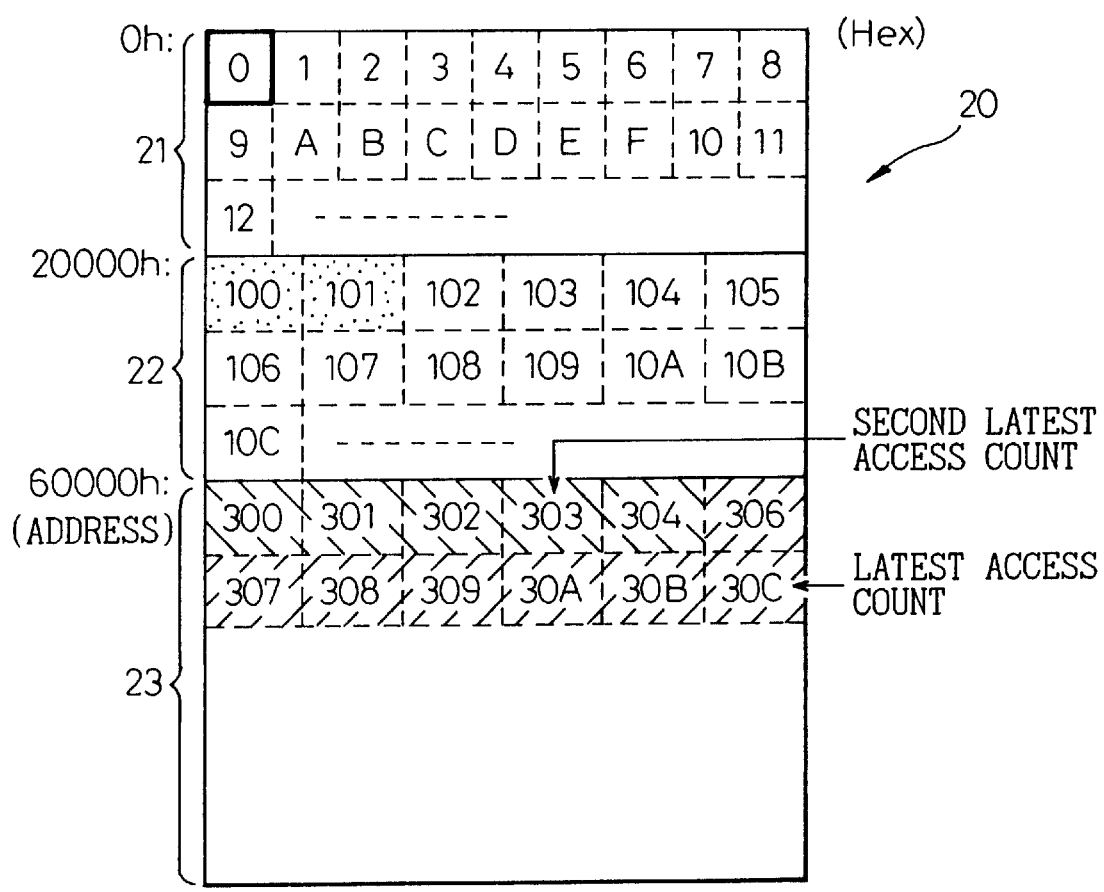
FIG. 6A is a block diagram showing the first embodiment of division of the cache memory shown in FIG. 4.

The first embodiment of division is, as shown in FIG. 6A, such that the data buffer area in the cache memory 20 included in the optical disk drive 1 is divided into the FAT-associated data buffer area 21 ranging from buffer address 0h to 19999h, the DIR-associated data buffer area 22 ranging from buffer address 20000h to 59999h, and the data division-associated data buffer area 23 starting with buffer address 60000h. In this embodiment, the size of the cache memory 20 is so large that the data buffer areas 21 and 22 of the same sizes as the FAT 31 and DIR 32 in the disk medium to be used by the OS can be defined in the cache memory and the data division-associated data buffer area 23 can be sufficiently defined in the cache memory 20.

Buffer addresses associated with LBAs in the optical disk 6 are assigned to the FAT-associated data buffer area 21 and DIR-associated data buffer area 22.

In this embodiment, data read from LBA 0 in the FAT 31 and shared by file A and file B shown in FIG. 5 is stored in the FAT-associated data buffer area 21 in the cache memory 20. Data read from LBAs 100 and 101 in the DIR 32 is stored in the DIR-associated data buffer area 22 in the cache memory 20. Data read from LBAs 300 to 304 in the data division 33 and belonging to file A, and data read from LBAs 306 to 30C can be stored in the data division-associated data buffer area 23. In this embodiment, when the data division-associated data buffer area 23 becomes full, buffer addresses at which new data is stored can be set to addresses starting with an address containing information whose storage date is old or an address containing information whose access frequency is low.

(2) Second Embodiment

Figure 6B:
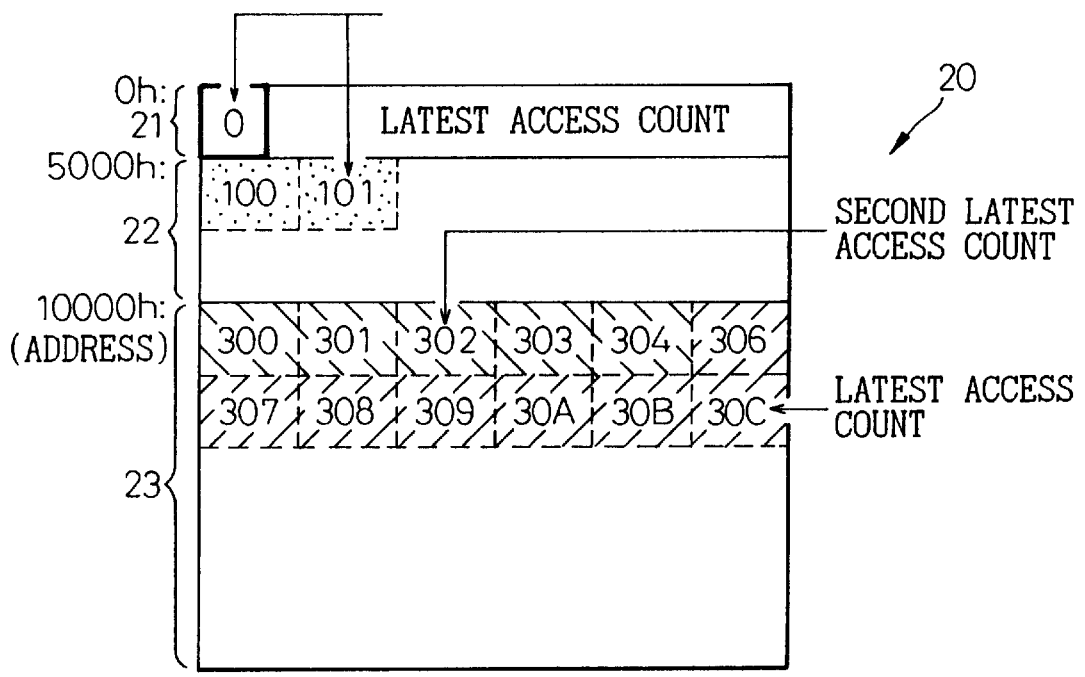
FIG. 6B is a block diagram showing the second embodiment of division of the cache memory shown in FIG. 4.

The second embodiment of division is, as shown in FIG. 6B, such that the data buffer area in the cache memory 20 included in the optical disk drive 1 is divided into the FAT-associated data buffer area 21 ranging from buffer address 0h to 4999h, the DIR-associated data buffer area 22 ranging from buffer address 5000h to 9999h, and the data division-associated data buffer area starting with buffer address 10000h. This embodiment is adopted when the cache memory 20 is too small in size to define memory areas of the sizes equivalent to the sizes of the FAT 31 and DIR 32 in the optical disk 6 in the data buffer area in the cache memory 20. Even in this case, both the FAT-associated data buffer area 21 used to store data read from the FAT 31 in the optical disk 6 and the DIR-associated data buffer area 22 used to store data read from the DIR 32 are defined. However, the sizes of the buffer areas 21 and 22 are reduced compared with those in the first embodiment. Buffer addresses associated with the LBAs referring to the FAT 31 and DIR 32 in the optical disk 6 cannot therefore be set in the FAT-associated data buffer area 21 and DIR-associated data buffer area 22 in the cache memory 20. In the second embodiment, therefore, the FAT-associated data buffer area 21 and DIR-associated data buffer area 22 are managed in the same manner as the data division-associated data buffer area 23 in the first embodiment.

(3) Third Embodiment

The third embodiment of division is, as shown in FIG. 7A, such that the data buffer area in the cache memory 20 included in the optical disk drive 1 is divided into the FAT-associated data buffer area 21 ranging from buffer address 0h to 19999h, the DIR-associated data buffer area 22 ranging from buffer address 20000h to 29999h, and the data division-associated data buffer area 23 starting with buffer address 30000h. The third embodiment is an embodiment in which the size of the cache memory 20 is smaller that that of the cache memory in the first embodiment but is larger than that of the cache memory 20 in the second embodiment. In the third embodiment, therefore, the data buffer area 21 having the same size as the FAT 31 in the optical disk 6 of which data is used by the OS is defined in the cache memory 20. In relation to the DIR 32 in the optical disk 6, the data buffer area 22 of the minimal size is defined in the cache memory 20. The remaining data buffer area is used as the data division-associated data buffer area 23.

In the third embodiment, management of the DIR-associated data buffer area 22 is carried out in the same manner as management of the data division-associated data buffer area 23 in the first embodiment.

(4) Fourth Embodiment

The fourth embodiment of division is, as shown in FIG. 7B, such that the data buffer area in the cache memory 20 included in the optical disk drive 1 is divided into the FAT-associated data buffer area 21 ranging from buffer address 0h to 4999h, the DIR-associated data buffer area 22 ranging from buffer address 50000h to 44999h, and the data division-associated data buffer area 23 starting with buffer address 450000h. Even in the fourth embodiment, the size of the cache memory 20 is smaller than that of the cache memory 20 in the first embodiment but is larger than that of the cache memory 20 in the second embodiment. In the fourth embodiment, therefore, the data buffer area 22 having the same size as the DIR 32 in the optical disk 6 of which data is used by the OS is defined in the cache memory 20. In relation to the FAT 31 in the optical disk 6, the data buffer area 21 of the minimal size is defined in the cache memory 20. The remaining data buffer area is entirely used as the data division-associated data buffer area 23.

In the fourth embodiment, management of the FAT-associated data buffer area 21 is carried out in the same manner as management of the data division-associated data buffer area 23 in the first embodiment.

As in like the second to fourth embodiments, even when the data buffer area in the cache memory 20 is not large enough, if the capacity of a file to be read is small, data read from LBA 0 in the FAT 31 and belonging to file A and file B shown in FIG. 5 can be, as in the first embodiment, stored in the FAT-associated data buffer area 21 in the cache memory 20. Data read from LBAs 100 and 101 in the DIR 32 can be stored in the DIR-associated data buffer area 22 in the cache memory 20. Data read from LBAs 300 to 304 in the data division 33 and belonging to file A as well as data read from LBAs 306 to 30C can be stored in the data division-associated data buffer area 23.

An example of a reading procedure to be followed by the OS in order to read file A stored in the optical disk 6 when the data buffer area in the cache memory 20 is divided into three areas in the same form as the first embodiment will be described in conjunction with the flowchart of FIGS. 8 to 10. For reading data that belongs to file A, first, data in the FAT 31 is read, data in the DIR 32 is then read, and data in the data division 33 is finally read. The reading procedure to be followed by the OS will be described in this order.

FIG. 8 shows a procedure of reading data from the FAT 31 in the optical disk 6. At step 801, it is judged whether or not a reading instruction instructing reading of the FAT 31 has been issued from the host system. If the reading instruction has been issued, control is passed to step 802. It is then judged whether or not valid data is present in the FAT-associated data buffer area 21 in the cache memory 20. Initially, no valid data is present in the FAT-associated data buffer area 21. Control is therefore passed to step 803. Data in the FAT 31 in the optical disk 6 is read and stored at buffer address 0h in the FAT-associated data buffer area 21 in the cache memory 20. At step 804, data in the FAT-associated data buffer area 21 is transferred.

Data in the FAT 31 which belongs to file A is, as described in conjunction with FIG. 5, stored at LBA 0 in the optical disk 6. In the cache memory 20 included in the optical disk drive 1, there is buffer address 0h assigned exclusively for storage of data in the FAT 31 in the optical disk 6. The optical disk drive 1 reads data from one block starting with LBA 0 in the storage area in the optical disk 6, develops it at address 0h in the FAT-associated data buffer area 21 in the cache memory 20, and then transfers it to the host system. The data developed in the FAT-associated data buffer area 21 is preserved as it is and validated.

After the data developed in the FAT-associated data buffer area 21 is transferred at step 804, control is passed to step 805. It is then judged whether or not reading data from the FAT 31 in the optical disk 6 has been completed. If reading of data in the FAT 31 in the optical disk 6 has not been completed, control is passed to step 806. It is judged whether or not the next instruction has been issued from the host system. If the next instruction has not been issued, the optical disk drive 1 passes control to step 807, reads ahead data residing in one block of the next LBA in the FAT 31 in the optical disk 6, and stores the data at the subsequent buffer address in the FAT-associated data buffer area 21 in the cache memory.

After the data residing in one block of the next LBA in the FAT 31 in the optical disk 6 is read ahead and stored in the FAT-associated data buffer area 21, control is returned to step 805. It is judged whether or not reading of data in the FAT 31 in the optical disk 6 has been completed. Unless it is judged at step 805 that reading of data in the FAT 31 in the optical disk 6 has been completed or it is judged at step 806 that the next instruction has been issued from the host system, the operation of reading ahead data residing in one block of the next LBA in the FAT 31 in the optical disk 6 and storing it at the next buffer address in the FAT-associated data buffer area 21 is repeated.

In contrast, when it is judged at step 805 that reading of data in the FAT 31 in the optical disk 6 has been completed or it is judged at step 806 that the next instruction has been issued from the host system, control is returned to step 801. It is then judged at step 801 whether or not the instruction sent from the host system is a reading instruction instructing reading of the FAT. If the instruction is any instruction other than the reading instruction instructing reading of the FAT, control is passed to step 808.

Figure 9:
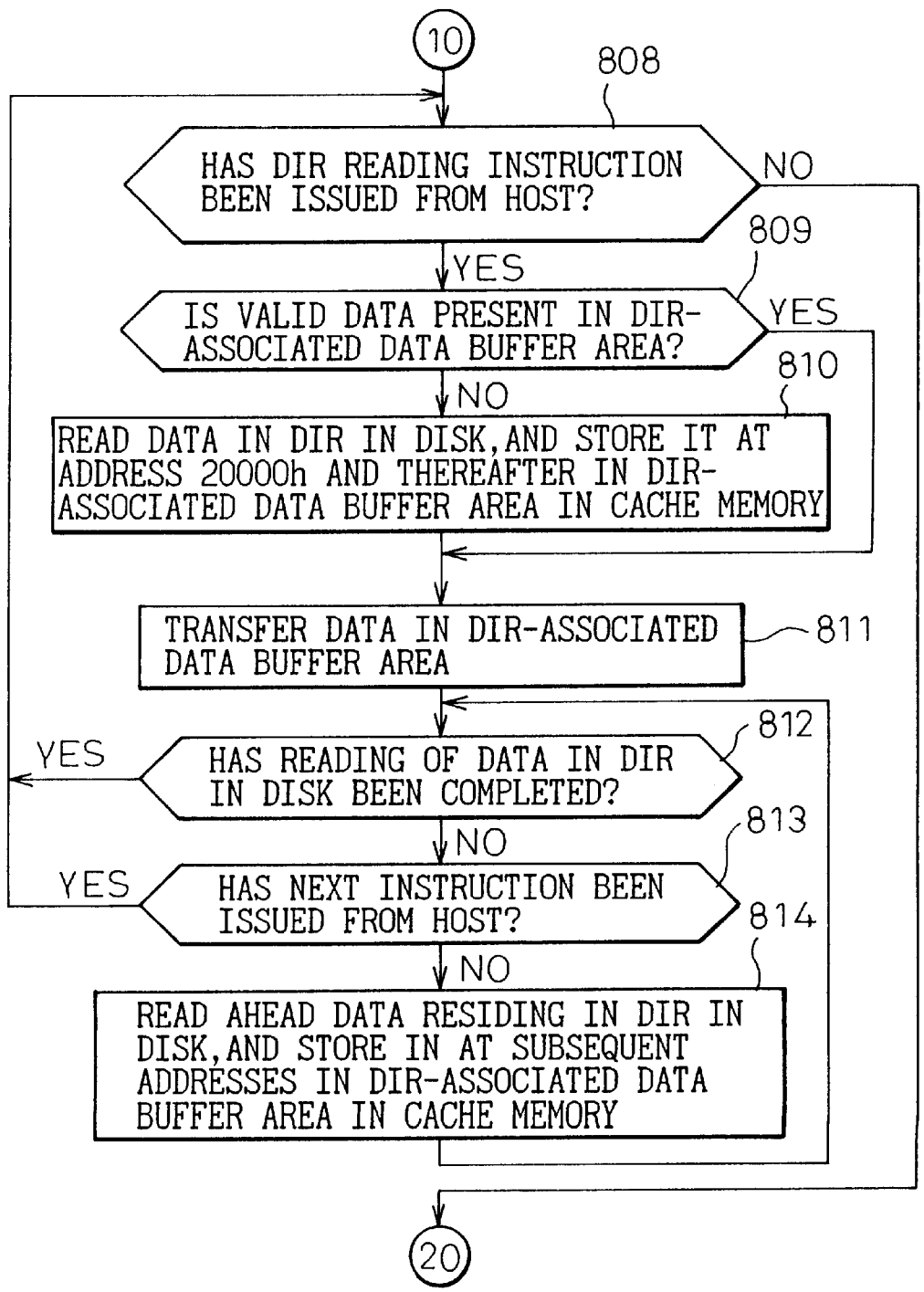
FIG. 9 is part of the flowchart describing the data reading procedure employed in the data buffer management method implemented in the storage device in accordance with the present invention.

FIG. 9 shows a procedure of reading data from the DIR 32 in the optical disk 6. At step 808, it is judged whether or not a reading instruction instructing reading of the DIR 32 has been issued from the host system. If the reading instruction has been issued, control is passed to step 809. It is then judged whether or not valid data is present in the DIR-associated data buffer area 22 in the cache memory 20. Initially, no valid data is present in the DIR-associated data buffer area 32. Control is therefore passed to step 81. Data in the DIR 32 in the optical disk 6 is read and stored at buffer address 20000h and thereafter in the DIR-associated data buffer area 22 in the cache memory 20. At step 811, data in the DIR-associated data buffer area 22 is transferred.

Data in the DIR 32 which belongs to file A is, as described in conjunction with FIG. 5, stored in two blocks starting with LBA 100 in the optical disk 6. In the cache memory 20 included in the optical disk drive 1, there is buffer address 20000h assigned exclusively for storage of data read from the DIR 32 in the optical disk 6. The optical disk drive 1 reads data from two blocks starting with LBA 100 in the storage area in the optical disk 6, develops it at buffer area 20000h and thereafter in the DIR-associated data buffer area in the cache memory 20, and then transfers it to the host system. The data developed in the DIR-associated data buffer area 22 is preserved as it is and validated.

After data developed in the DIR-associated data buffer area 23 is transferred at step 811, control is passed to step 812. It is judged whether or not reading of data in the DIR 32 in the optical disk 6 has been completed. If reading of data in the DIR 32 in the optical disk 6 has not been completed, control is passed to step 813. It is judged whether or not the next instruction has been issued from the host system. If no instruction has been issued, the optical disk drive 1 passes control to step 814, reads ahead data residing in one block of the next LBA in the DIR 32 in the optical disk 6, and stores it at the subsequent buffer addresses in the DIR-associated data buffer area 22 in the cache memory 20.

After data residing in one block of the next LBA in the DIR 32 in the optical disk 6 is read ahead and stored in the DIR-associated data buffer area 22, control is returned to step 812. It is judged again whether or not reading of data in the DIR 32 in the optical disk 6 has been completed. Thereafter, unless it is judged at step 812 that reading of data in the DIR 32 in the optical disk 6 has been completed or it is judged at step 813 that the next instruction has been issued from the host system, the operation of reading ahead data that resides in one block of the next LBA in the DIR 32 in the optical disk 6 and storing it at the subsequent buffer addresses in the DIR-associated data buffer area 22 is repeated.

By contrast, if it is judged at step 812 that reading of data in the DIR 32 in the optical disk 6 has been completed or if it is judged at step 813 that the next instruction has been issued from the host system, control is returned to step 808. At step 808, it is judged whether or not the instruction sent from the host system is a reading instruction instructing reading of the DIR 32. If the instruction is any instruction other than the reading instruction instructing reading of the DIR 32, control is passed to step 815.

Figure 10:
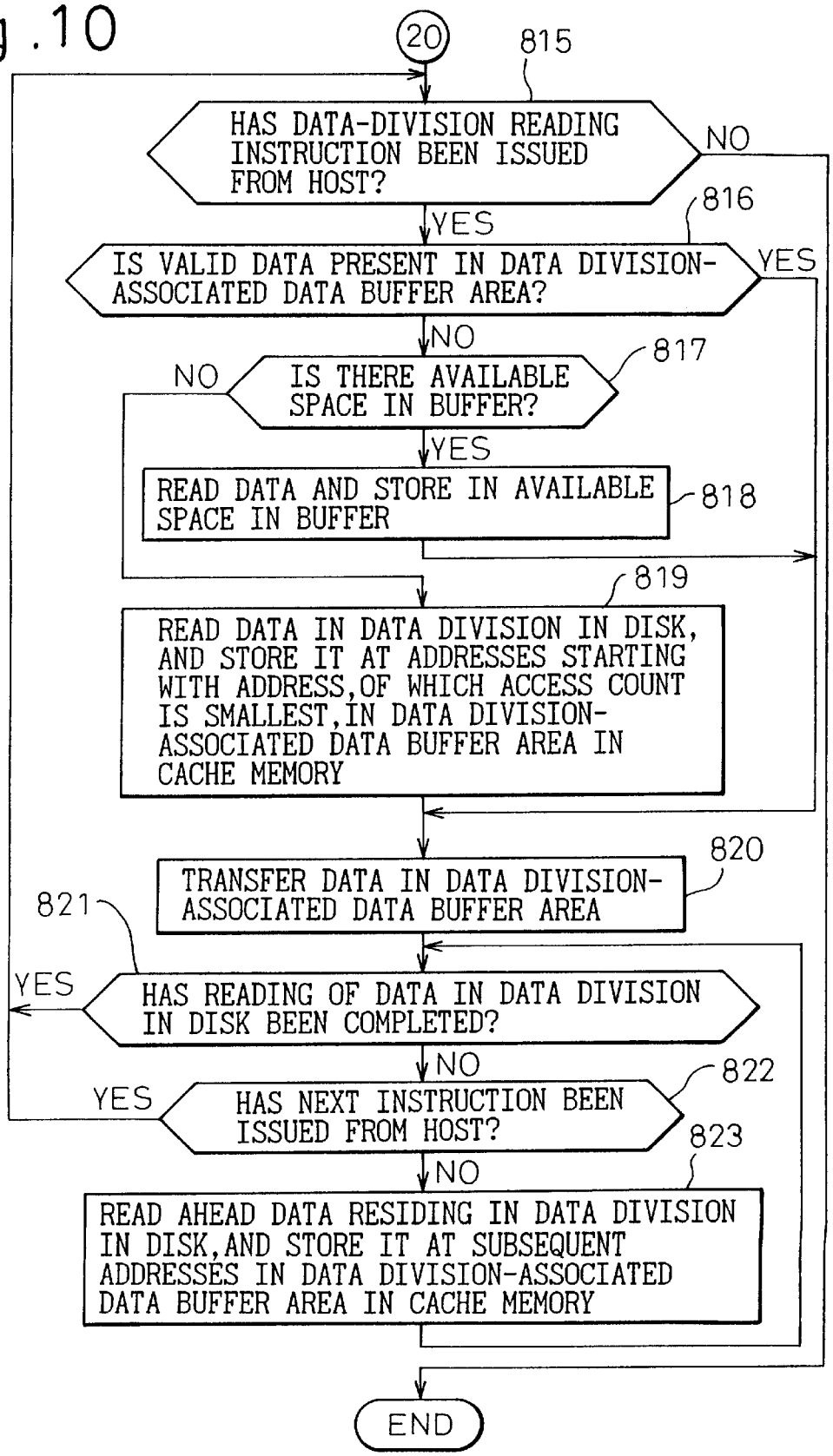
FIG. 10 is part of the flowchart describing the data reading procedure employed in the data buffer management method implemented in the storage device in accordance with the present invention.

FIG. 10 describes a procedure of reading intended data in the data division 33 in the optical disk 6. At step 815, it is judged whether or not a reading instruction instructing reading of the data division 33 has been issued from the host system. If the reading instruction has been issued, control is passed to step 816. It is judged whether or not valid data is present in the data division-associated data buffer area 23 in the cache memory 20. Initially, no valid data is present in the data division-associated data buffer area 23. Control is therefore passed to step 817. It is judged whether or not there is an available space in the buffer, that is, there is an available space in the data division-associated data buffer area 23. If there is an available space, control is passed to step 818. Read data is stored in the available space in the buffer, and control is passed to step 820. By contrast, if it is judged at step 817 that there is no available space in the buffer, control is passed to step 819. Data in the data division 33 in the optical disk 6 is read and stored at addresses starting with an address containing data, of which access count is the smallest, in the data division-associated data buffer area 23 in the cache memory 20. At the next step 820, the data in the data division-associated data buffer area 23 is transferred.

Data in the data division 33 which belongs to file A is, as described in conjunction with FIG. 5, stored in five blocks starting with LBA 300 in the optical disk 6. In the cache memory 20 included in the optical disk drive 1, there are buffer address 60000h and thereafter assigned exclusively for storage of data read from the data division 33 in the optical disk 6. The amount of data that can be recorded in the data division 33 is much larger than the amount of data recorded in the FAT 31 or DIR 32, and is normally larger than the storage capacity of the data division-associated data buffer area 23 in the cache memory 20. The addresses in the data division-associated data buffer area 23 in the cache memory 20 included in the optical disk drive 1 is, unlike the FAT-associated data buffer area 21 and DIR-associated data buffer area 22, not associated with the addresses in the data division 33 in the optical disk 6. In other words, the data division-associated data buffer area 23 does not have addresses assigned exclusively to data items in the optical disk 6.

In the foregoing data division-associated data buffer area 23, buffer addresses starting with a buffer address whose access count provided by the access counter described in conjunction with FIG. 3 is the smallest are determined as a development destination. Information indicating that data is valid or invalid is appended to the data division-associated data buffer area 23. For storing data read from the data division 33 in the optical disk 6 in the data division-associated data buffer area 23, access counts of addresses are retained at the access counters. Data at buffer addresses starting with a buffer address whose access count is the smallest is overwritten, and the access count of the buffer address is updated. For initially storing data that belongs to file A and read from the data division 33, since the whole of the data division-associated data buffer area 23 indicates that data is invalid, data residing in five blocks starting with LBA 300 in the storage area in the optical disk 6 is read, developed at address 60000h and thereafter in the data division-associated data buffer area 23, and then transferred. The data developed in the data division-associated data buffer area 23 is preserved as it is and validated.

After the data developed in the data division-associated data buffer area 23 is transferred at step 820, control is passed to step 821. It is judged whether or not reading of data in the data division 33 in the optical disk 6 which belongs to file A has been completed. If reading of data in the data division 33 which belongs to file A has not been completed, control is passed to step 822. It is judged whether or not the next instruction has been issued from the host system. If the next instruction has not been issued, the optical disk drive 1 passes control to step 823, reads ahead data, residing in one block of the next LBA in the data division 33 and belonging to file A, and then stores it at buffer addresses starting with a buffer address, of which access count is the smallest, in the data division-associated data buffer area 23 in the cache memory 20.

After the data residing in one block of the next LBA in the data division 33 and belonging to file A is read ahead and stored in the data division-associated data buffer area 23, control is returned to step 821. It is judged again whether or not reading of data in the data division 33 which belongs to file A has been completed. Thereafter, unless it is judged at step 821 that reading of data in the data division 33 which belongs to file A has been completed or it is judged at step 822 that the next instruction has been issued from the host system, the operation of reading ahead data that resides in one block of the next LBA in the data division 33 and belongs to file A, and storing it at buffer addresses starting with a buffer address, of which access count is the smallest, in the data division-associated data buffer area 23 is repeated.

By contrast, if it is judged at step 821 that reading of data in the data division 33 which belongs to file A has been completed, or if it is judged at step 822 that the next instruction has been issued from the host system, control is returned to step 815. At step 815, it is judged whether or not the instruction sent from the host system is a reading instruction instructing reading of data in the data division 33 which belongs to file A. If the instruction is any instruction other than the reading instruction instructing reading of the data division 33, the routine is terminated.

When data belonging to file A is thus read, a medium access operation is carried out three times.

Like the second to fourth embodiments, when the size of the FAT-associated data buffer area 21 or DIR-associated data buffer area 22 in the cache memory 20 is so small that the amount of read data may exceed the storage capacity of the FAT-associated data buffer area 21 or DIR-associated data buffer area 22, the FAT-associated data buffer area 21 or DIR-associated data buffer area 22 is managed using access counters in the same manner as the data division-associated data buffer area 23. When the FAT-associated data buffer area 21 or DIR-associated data buffer area 22 becomes full and therefore cannot permit development of data, the values of the access counters are referenced. Data is read from a disk medium and developed at a buffer address whose access count is the smallest or, if a plurality of buffer addresses exhibit the smallest access count, at a buffer address containing the oldest data. The access counter for the newly developed data is then set. When data can be read in the same manner as valid data, the value of the access counter may be updated in order to keep the data valid.

Thereafter, when data in the data division which belongs to file B is read by the OS, data in the FAT 31 is read first according to the same procedure as the aforesaid one. However, data corresponding to data residing in one block starting with LBA 0 in the FAT 31 from which data is about to be read is present at address 0h in the FAT-associated data buffer area 21 at which read data belonging to file A has been stored. Data in the FAT 31 which belongs to file B can therefore be transferred from the FAT-associated data buffer area 21 in the cache memory without the necessity of actually reading data from the optical disk 6.

Data in the DIR 32 which belongs to file B is then read. Since data corresponding to the data is present as previously-validated data at address 20000h in the DIR-associated data buffer area 22 in the cache memory 20, the data can be transferred from the DIR-associated data buffer area 22 in the cache memory 20. Finally, intended data in the data division 33 which belongs to file B is read. Since corresponding data is not present in the data division-associated data buffer area 23, the data belonging to file B is read from seven blocks starting with LBA 306 in the storage area in the optical disk 6, developed at buffer addresses succeeding to the buffer addresses, at which data has been developed previously, in the data division-associated data buffer area 23, and then transferred. The developed data is preserved in the data buffer and validated. At this time, the value of the access counter for address 60000h at which data has been developed previously becomes older or is incremented by one. When data belonging to file B is read subsequently to data belonging to file A, an operation of reading data from the optical disk 6 should actually be carried out only once.

Moreover, when any other data is read by the OS, if data in the FAT-associated data buffer area 21 or DIR-associated data buffer area in the cache memory 20 is usable, the same operation as the reading operation involving file B should merely be carried out. Moreover, when data in the FAT-associated data buffer area 21 or DIR-associated data buffer area 22 in the cache memory 20 is unusable, the same operation as the reading operation involving file A should be carried out. When the reading operation involving a file is repeated, the amount of valid data in the FAT-associated data buffer area 21 or DIR-associated data buffer area 22 in the cache memory 20 increases. All data read from the FAT 31 and DIR 32 in the optical disk 6 which is used by the OS is stored in the cache memory 20 and validated. All operations of reading data from the FAT 31 and DIR 32 in the optical disk to be performed by the OS are achieved merely by transferring the data from the buffer. This results in the improved performance of the optical disk drive 1.

Next, a variant of a method of dividing a data buffer that is the cache memory 20 in accordance with the present invention will be described.

(5) Fifth Embodiment

Figure 11A:
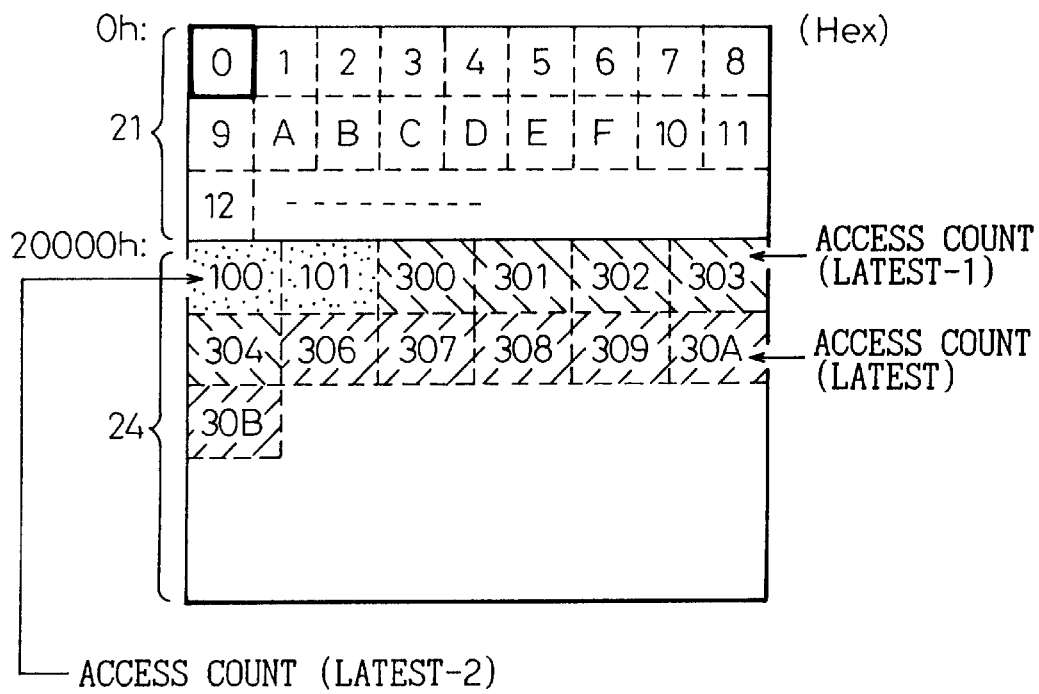
FIG. 11A is a block diagram showing the fifth embodiment of division of the cache memory shown in FIG. 4.

The fifth embodiment of division is, as shown in FIG. 11A, such that the data buffer area in the cache memory 20 included in the optical disk drive 1 is divided into the FAT-associated data buffer area 21 ranging from buffer address 0h to 19999h, and a DIR and data division-associated data buffer area 24 starting with buffer address 20000h. Even this embodiment is an embodiment to be adopted when the size of the cache memory 20 is small, and areas of the sizes equivalent to the storage capacities of the FAT 31 and DIR 32 in the optical disk 6 cannot be defined in the data buffer area in the cache memory 20.

In the fifth embodiment, unlike the aforesaid first to fourth embodiments, only the FAT-associated data buffer area 21 in the cache memory 20 is defined as a dedicated data buffer area having the same size as the FAT 31 in the optical disk 6. According to the fifth embodiment, in relation to the DIR 32 and data division 33 in the optical disk 6, the DIR and data division-associated data buffer area 24 is defined in the cache memory 20 and used in common.

Buffer addresses associated with the addresses in the DIR 32 and data division 33 in the optical disk 6 cannot therefore be set in the DIR and data division-associated data buffer area 24 in the cache memory 20. In the fifth embodiment, therefore, management of the DIR and data division-associated data buffer area 24 is carried out in the same manner as management of the data division-associated data buffer area 23 in the first embodiment.

(6) Sixth Embodiment

Figure 11B:
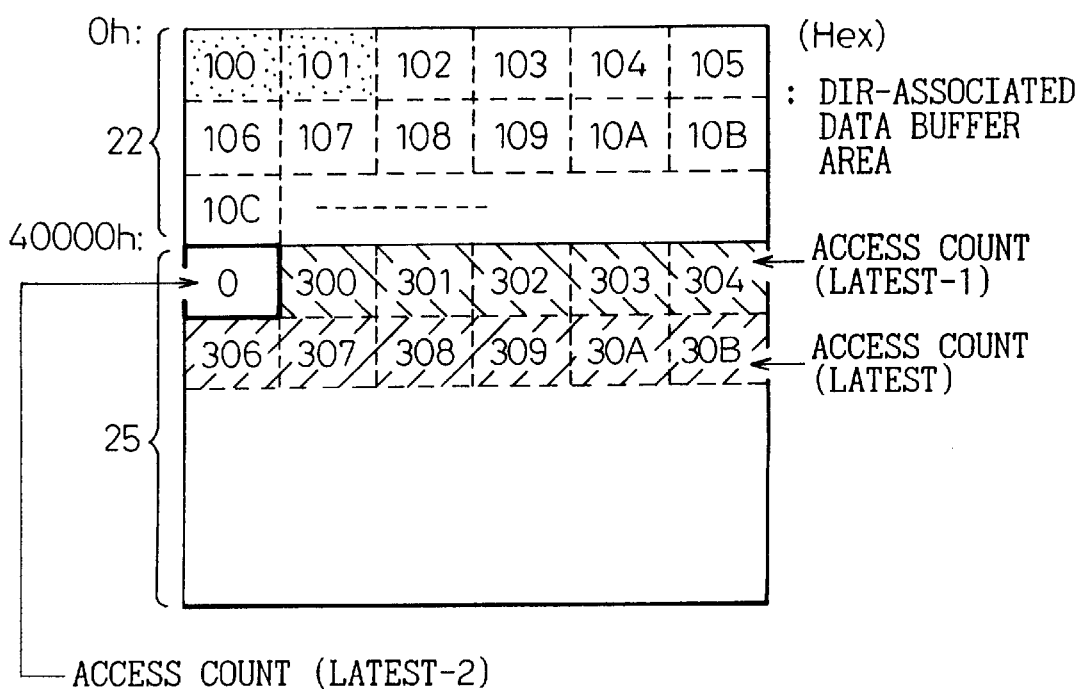
FIG. 11B is a block diagram showing the sixth embodiment of division of the cache memory shown in FIG. 4.

The sixth embodiment of division is, as shown in FIG. 11B, such that the data buffer area in the cache memory 20 included in the optical disk drive 1 is divided into the DIR-associated data buffer area 22 ranging from buffer address 0h to 39999h and the FAT and data division-associated data buffer area 25 starting with buffer address 40000h. Even this embodiment is an embodiment to be adopted when the size of the cache memory 20 is small, and areas of the sizes equivalent to the storage capacities of the FAT 31 and DIR 32 in the optical disk 6 cannot be defined in the data buffer area in the cache memory 20.

In the sixth embodiment, like the fifth embodiment, only the DIR-associated data buffer area 22 in the cache memory 20 is defined as a dedicated data buffer area having the same size as the DIR 32 in the optical disk 6. According to the sixth embodiment, in relation to the FAT 31 and data division 33 in the optical disk 6, the FAT and data division-associated data buffer area 25 is defined in the cache memory 20 and used in common.

Buffer addresses associated with the addresses in the FAT 31 and data division 33 in the optical disk 6 cannot be set in the FAT and data division-associated data buffer area 25 in the cache memory 20. In the sixth embodiment, therefore, management of the FAT and data division-associated data buffer area 25 is achieved in the same manner as management of the data division-associated data buffer area 23 in the first embodiment.

In the fifth embodiment, when the OS intends to read data belonging to file A from the data division 33, data in the FAT 31 is read first. The data belonging to file A uses LBA 0 in the FAT. In the FAT-associated data buffer area 21 included in the optical disk drive 1, there is buffer address 0h assigned exclusively to LBA 0. The buffer address 0h initially indicates that data is invalid. In this case, the optical disk drive 1 first reads data from one block of LBA 0 in the storage area in the optical disk 6, develops it at address 0h in the FAT-associated data buffer area 21, and then transfers it. The developed data is preserved in the data buffer and validated.

The optical disk drive 1 then reads data from the DIR 32. The data in the DIR 32 belonging to file A uses LBA 100. Data corresponding to the data residing at LBA 100 in the DIR is not present in the DIR and data division-associated data buffer area 24 in the cache memory 20 included in the optical disk drive 1. The optical disk drive 1 reads data from two blocks starting with LBA 100 in the DIR 32 within the storage area in the optical disk 6, develops it at buffer address 20000h and thereafter in the DIR and data division-associated data buffer area 24, and then transfers it. The developed data is preserved in the data buffer and validated. The access counter is set to the latest value.

Finally, intended data in the data division is read. The data in the data division 33 which belongs to file A uses LBA 300. As data corresponding to the data residing in the DIR 32 is not present, so corresponding data is not present in the DIR and data division-associated data buffer area 24 in the cache memory 20 included in the optical disk drive. The optical disk drive 1 therefore reads data from five blocks starting with LBA 300 within the storage area in the optical disk 6, develops it at buffer address 20400h and thereafter at succeeding buffer addresses, at which the data read from the DIR 32 is developed in the DIR and data division-associated data buffer area 24, and then transfers it. The developed data is preserved in the data buffer and validated. The access counter is set to the latest value. At this time, the value of the access counter for buffer address 20000h at which previous data has been developed becomes older or is incremented by one. Thus, for reading data belonging to file A, a medium access operation is carried out three times.

Thereafter, when the OS intends to read data belonging to file B from the data division, data in the FAT 31 in the optical disk 6 is read first according to the same procedure as the aforesaid one. However, data corresponding to the data residing in one block starting with LBA 0 in the FAT from which data is about to be read is present at buffer address 0h in the FAT-associated data buffer area 21 in the cache memory 20. The optical disk drive 1 can therefore transfer data from the FAT-associated data buffer area 21 in the cache memory 20 without the necessity of reading it from the optical disk 6.

Data in the DIR 32 is then read. The corresponding data is also present as previously-validated data at address 20000h in the DIR and data division-associated data buffer area 24 in the cache memory 20. The data is therefore transferred from the cache memory 20. Finally, intended data in the data division is read. No corresponding data is present in the DIR and data division-associated data buffer area 24. The optical disk drive 1 therefore reads data belonging to file B from the data division 33 in the storage area in the optical disk 6, develops it at buffer address 20400h and thereafter succeeding the buffer addresses, at which previous data has been developed, in the DIR and data division-associated data buffer area 24, and then transfers it. The developed data is preserved in the DIR and data division-associated data buffer area 24 and is then validated. At this time, the values of the access counters for address 10400h at which previous data has been developed and address 20000h at which data preceding the previous data has been developed become older or are incremented by one. Thus, when the data belonging to file B is read successively to data belonging to file A, an operation should actually be carried out only once.

Moreover, when the OS intends to read any other data, if data stored in the cache memory 20 which corresponds to data residing in the FAT 31 or DIR 32 in the optical disk 6 is usable, the data can be transferred from the cache memory 20 without the necessity of accessing the optical disk 6.

Thereafter, when reading is repeated, the amount of valid data in the FAT-associated data buffer area 21 increases. In due course, data corresponding to all the data residing in the FAT 31 in the optical disk 6 which is used by the OS become valid in the FAT-associated data buffer area 21. The operation of reading the FAT 31 in the optical disk 6 becomes unnecessary. All the data can be transferred from the cache memory 20. As far as reading data from the DIR 32 or data division 33 in the optical disk 6 is concerned, when the DIR and data division-associated data buffer area 24 in the cache memory 20 becomes full and cannot permit development of data, the values of the access counters are referenced. The data read from the optical disk 6 is developed at a buffer address whose access count is the smallest, or if there are a plurality of buffer addresses exhibiting the smallest access count, at a buffer address containing the oldest data. An access counter is then set for the newly developed data. When data can be read in the same manner as valid data, the access counter for the data is updated in order to keep the data valid. Since a file whose use frequency of use by the OS is high remains intact in the cache memory 20, the number of accesses to the optical disk 6 gained by the optical disk drive 1 decreases, and the performance of the optical disk drive 1 improves.

The sixth embodiment is different from the fifth embodiment in only the point that when the OS intends to read data belonging to file A from the data division 33, data read from the FAT 31 in the optical disk 6 is stored together with data read from the data division 33 in the FAT and data division-associated data buffer area 25, and data read from the DIR 32 is stored in the dedicated DIR-associated data buffer area 22. The description of the sixth embodiment will therefore be omitted.

FIG. 12 is an explanatory diagram showing a shortened reading time, which is required by a method of the present invention in order to achieve reading of data from an optical disk medium when data corresponding to all the data residing in the FAT and DIR is present in a cache memory, in comparison with a data reading time required by a prior art. "Firmware" in the drawing is the firmware in the optical disk drive. Conventionally, every time a Read command instructing reading of the FAT, DIR, or data division is issued from the host system (OS), the optical disk drive instructs a seek of a head. When the head is moved to a reading position on an optical disk, a seek completion instruction is issued. Thereafter, data is read from the optical disk with a reading instruction. After reading is completed and read data is stored in the cache memory, the data is transferred from the optical disk drive to the host system.

By contrast, according to the method of the present invention, when reading data from an optical disk is instructed, if data corresponding to all the data residing in the FAT, DIR, and data division is present in the cache memory, every after a Read command instructing reading of the FAT, DIR, or data division is issued, data can be transferred from the cache memory. This obviates the necessity of accessing the optical disk using a head. As a result, a FAT reading time, DIR reading time, and data division reading time are all shortened. The time by which the total reading time is shortened becomes T0. The reading time can be shortened by the time T0.

FIG. 13 is an explanatory diagram showing a shortened reading time, which is required by a method of the present invention in order to achieve reading of data from an optical disk, when data corresponding to data residing in the FAT and DIR is present in the cache memory, in comparison with a data reading time required by the prior art.

In this case, according to the method of the present invention, a data division reading time alone is the same as a conventional data division reading time, but an FAT reading time and DIR reading time are shorter than conventional ones. As a result, the FAT reading time and DIR reading time are shortened. The time by which the total reading time is shortened is T1. The total reading time can be shortened by the time T1.

Figure 14:
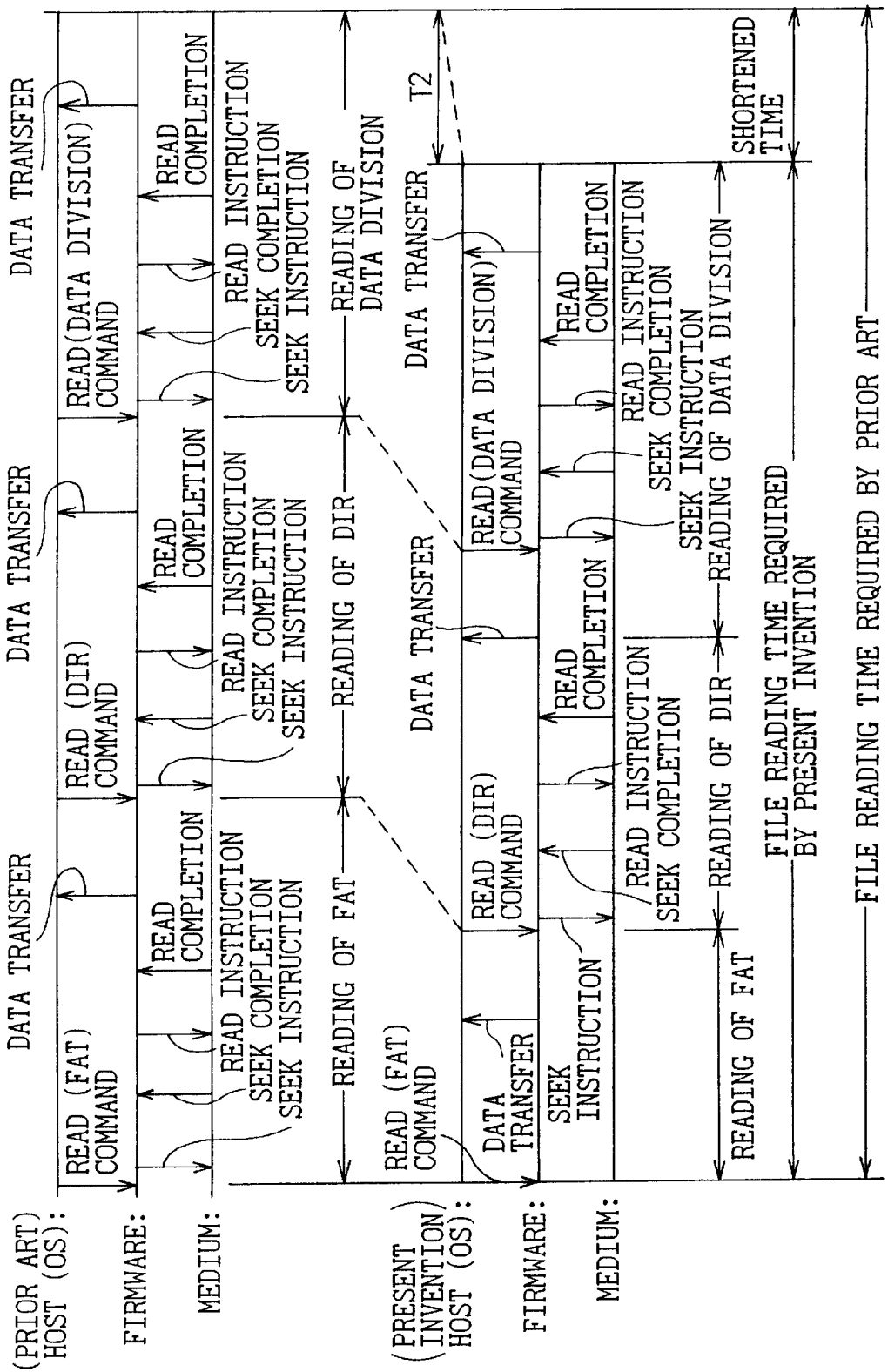
FIG. 14 is an explanatory diagram showing a shortened reading time, which is required for reading data from a storage medium when data corresponding to data in read the FAT alone is found in the cache memory, in comparison with a conventional data reading time.

FIG. 14 is an explanatory diagram showing a shortened reading time, which is required by a method of the present invention in order to achieve reading of data from an optical disk when data corresponding to data residing in the FAT alone is present in the cache memory, in comparison with a data reading time required by the prior art.

In this case, according to the present invention, a DIR reading time and data division reading time are the same as conventional ones, but an FAT reading time is shorter than a conventional one. As a result, the FAT reading time is shortened by a time T2. The total reading time is shortened by the time T2.

Figure 15:
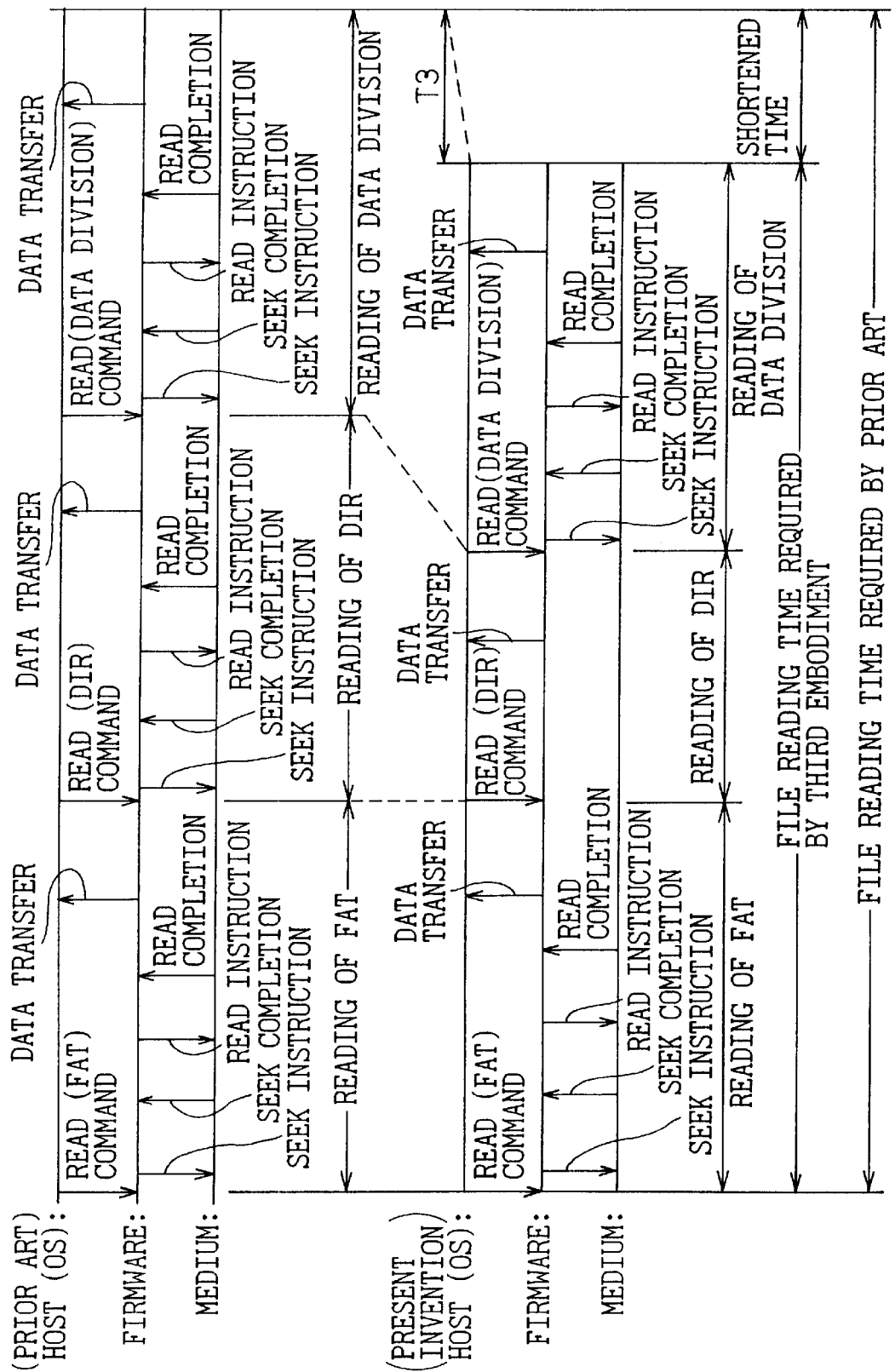
FIG. 15 is an explanatory diagram showing a shortened reading time, which is required for reading data from a storage medium when data corresponding to data in the DIR alone is found in the cache memory, in comparison with a conventional data reading time.

FIG. 15 is an explanatory diagram showing a shortened reading time, which is required by a method of the present invention in order to achieve reading of data from an optical disk when data corresponding to data residing in the DIR alone is present in the cache memory, in comparison with a data reading time required by the prior art.

In this case, according to the method of the present invention, an FAT reading time and data division reading time are the same as conventional ones, but a DIR reading time is shorter than a conventional one. As a result, the DIR reading time is shortened by a time T3. The total reading time is shortened by the time T3.

Figure 16A:
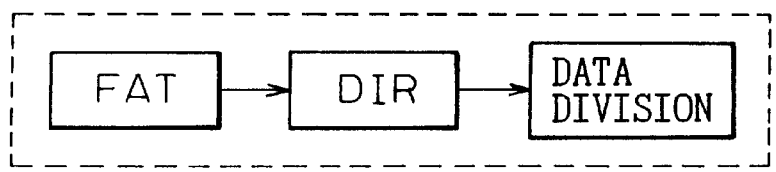
FIGS. 16A to 16F are explanatory diagrams showing data reading times required for reading data from a storage medium under various conditions.
Figure 16B:
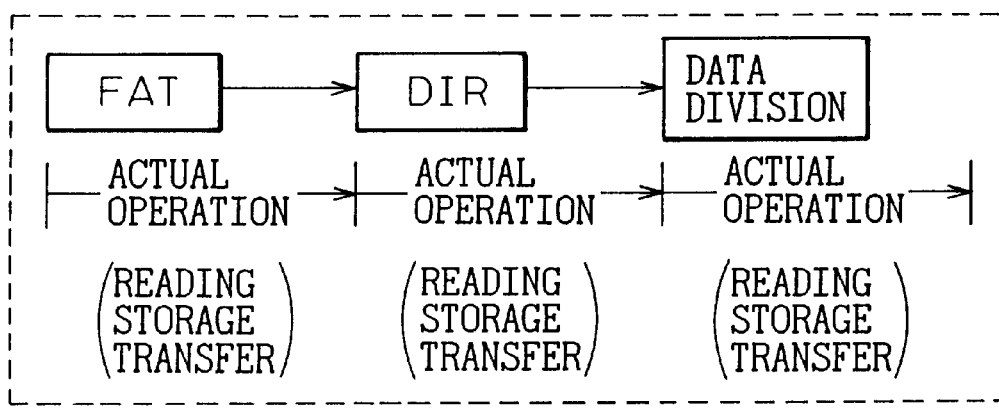

FIGS. 16A to 16F are explanatory diagrams showing data readings of reading data from an optical disk under various conditions in comparison with conventional data reading. For reading data, as shown in FIG. 16A, the host computer must read all the data in the FAT, DIR, and data division. In this case, according to a conventional cache control mode shown in FIG. 16B, actual operations of reading, storage, and transfer are required for reading all the data in the FAT, DIR, and data division. It takes much time to complete the whole read process.

Figure 16C:
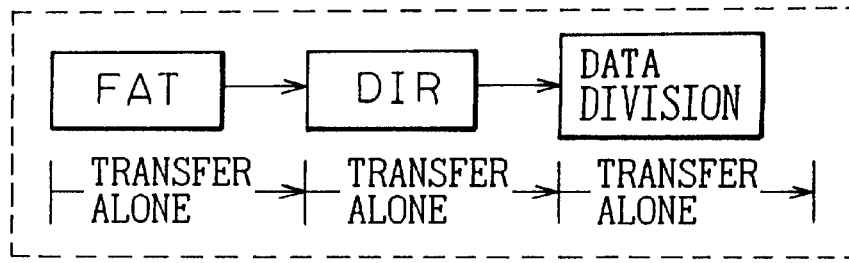
Figure 16D:
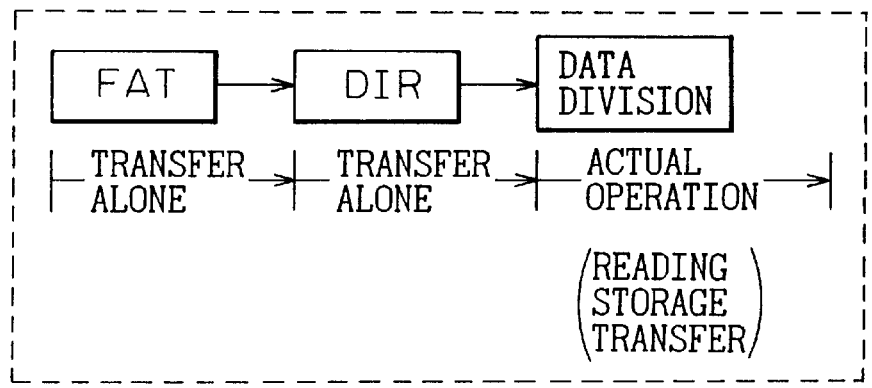
Figure 16E:
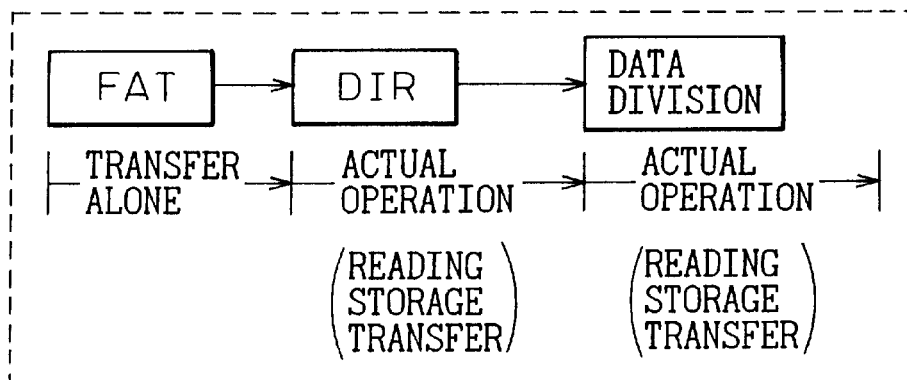
Figure 16F:
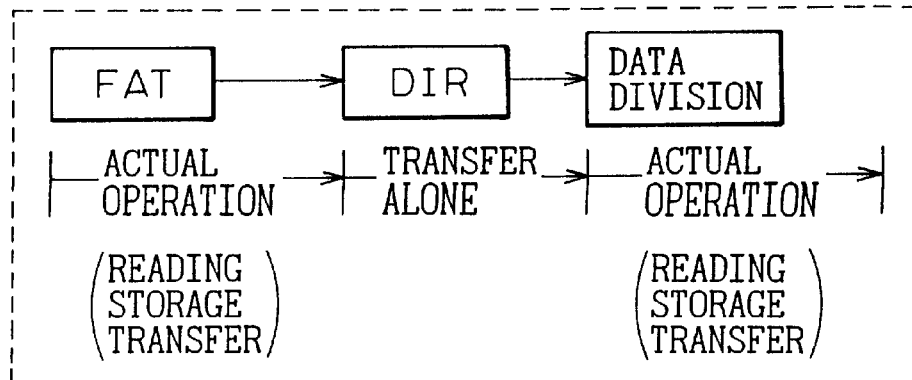

By contrast, FIGS. 16C to 16F show data reading in a cache control mode in accordance with the present invention. FIG. 16C shows data reading performed under the same condition as the one described in conjunction with FIG. 12. That is to say, data corresponding to all the data residing in the FAT, DIR, and data division is present in the cache memory, and all the data can be transferred from the cache memory. FIG. 16D shows data reading performed under the same condition as the one described in conjunction with FIG. 13. Data corresponding to the data residing in the FAT and DIR is present in the cache memory, and can therefore be transferred from the cache memory. In this case, the total reading time can be shortened by the second greatest magnitude following the magnitude attained under the condition for data reading shown in FIG. 6C. FIGS. 16E and 16F show data readings performed under the condition that data corresponding to the data residing in either the FAT or DIR is present in the cache memory and can therefore be transferred from the cache memory. FIG. 16E shows data reading performed under the same condition as the one described in conjunction with FIG. 14, and FIG. 16F shows data reading performed under the same condition as the one described in conjunction with FIG. 15. Even when data corresponding to the data residing in either the FAT or DIR is present in the cache memory, the reading time can be shortened compared with the one required according to a conventional cache control mode.

In the aforesaid embodiments, a storage device has been described by taking an optical disk drive for instance. According to a method of the present invention, the storage device is not limited to the optical disk device. The present invention can be effectively applied to a storage device in which a data transfer rate permitted by the storage device relative to a storage medium is lower than a data transfer rate permitted thereby relative to a host computer.

As described so far, according to a method of managing a data buffer in a storage device in accordance with the present invention, a cache hit ratio of data residing in a FAT or DIR improves. Consequently, the time required for actual operations of reading data from a storage medium, storing read data in the data buffer, and transferring data from the data buffer is shortened, and the processing speed at which the actual operations are carried out increases. As a result, the processing speed at which a series of operations are carried out for reading a data division increases.

What is claimed is:

1. A storage device having a data buffer in which data to be stored in a storage medium or data read from the storage medium is stored temporarily, and the storage medium including at least a storage unit for first information used to store data items constituting each file that is an information unit, a storage unit for second information which is an index table indicating storage locations of files, and a storage unit for third information which is list information of files, comprising:
    a first memory area for said first information which is bounded by a fixed boundary address within the memory area in the data buffer;
    a second memory area for said second information which is bounded by a fixed boundary address within the memory area in the data buffer;
    a third memory area for said third information which is bounded by a fixed boundary address within the memory area in the data buffer; and
    a data buffer managing means that, when data is read from said storage medium, stores and preserves data read from said first information storage unit in said first memory area, stores and preserves data read from said second information storage unit in said second memory area, and stores and preserves data read from said third information storage unit in said third memory area.

2. A storage device according to claim 1, wherein said storage device is an optical disk drive.

3. A storage device according to claim 2, wherein said first information storage unit is a data division, said second information storage unit is an index table, and said third information storage unit is a directory.

4. A storage device according to claim 3, wherein said data buffer is a cache memory.

5. A storage device according to claim 1, wherein the storage capacity of said second information memory area in said data buffer and the storage capacity of said third information memory area therein agree with the storage capacity of said second information storage unit in said storage medium and the storage capacity of said third information storage unit therein respectively.

6. A storage device according to claim 5, wherein said storage device is an optical disk drive.

7. A storage device according to claim 6, wherein said first information storage unit is a data division, said second information storage unit is an index table, and said third information storage unit is a directory.

8. A storage device according to claim 7, wherein said data buffer is a cache memory.

9. A storage device according to claim 1, wherein the storage capacity of one of said second information memory area and third information memory area in said data buffer agrees with the storage capacity of an associated information storage unit in said data medium.

10. A storage device according to claim 9, wherein said storage device is an optical disk drive.

11. A storage device according to claim 10, wherein said first information storage unit is a data division, said second information storage unit is an index table, and said third information storage unit is a directory.

12. A storage device according to claim 11, wherein said data buffer is a cache memory.

13. A storage device according to claim 1, further comprising an advance data reading unit, said advance data reading unit reading successive data in advance from the storage medium and storing said successive data in a corresponding one of said memory areas in the data buffer of the storage device.

14. A storage device comprising a storage medium, and a data buffer in which data to be stored in said storage medium or data read from said storage medium is stored temporarily, said storage medium including a storage unit for first information used to store data items constituting each file that is an information unit, a storage unit for second information which is an index table indicating storage location of files, and a storage unit for third information which is list information of files, said storage device for reading or writing desired data on the basis of the information in said storage units, comprising:
    memory area with a small storage capacity bounded by a fixed boundary address within the memory area in said data buffer, and used exclusively to store data read from one of said second information storage unit and third information storage unit in said storage medium;
    memory area with a large storage capacity bounded by a fixed boundary address within the memory area in said data buffer, and used in common to store data read from the other one of said second information storage unit and third information storage unit in said storage medium, and data read from said first information storage unit; and
    a data buffer managing means that when data is read from said storage medium, stores and preserves data read from one of said second information storage unit and third information storage unit in said storage medium in said memory area with a small storage capacity in said data buffer, and stores and preserves data read from the other one of said second information storage unit and third information storage unit in common in said memory area with a large storage capacity.

15. A storage device according to claim 14, wherein said storage device is an optical disk drive.

16. A storage device according to claim 15, wherein said first information storage unit is a data division, said second information storage unit is an index table, and said third information storage unit is a directory.

17. A storage device according to claim 16, wherein said data buffer is a cache memory.

18. A storage device according to claim 1, wherein when said memory area in said data buffer becomes full, said data buffer managing means sets buffer addresses, at which new data is stored, to addresses starting with an address containing information whose storage date is old.

19. A storage device according to claim 1, wherein when said memory area in said data buffer becomes full, said data buffer managing means sets buffer addresses, at which new data is stored, to addresses starting with an address containing information whose access frequency is low.

20. A storage device according to claim 14, further comprising an advance data reading unit, said advance data reading unit reading successive data in advance from the storage medium and storing said successive data in a corresponding one of said memory areas in the data buffer of the storage device.

* * * * *